US005986986A

United States Patent [19]

Todo et al.

[11] Patent Number: 5,986,986

[45] Date of Patent: Nov. 16, 1999

[54] METHOD FOR REGENERATING SYNCHRONIZING SIGNAL BY JUDGING WHETHER OR NOT THE EXTRACTED SYNCHRONIZING SIGNAL INCLUDES THE SECOND AND THIRD WINDOW SIGNALS

[75] Inventors: Hirofumi Todo, Tokyo; Masahiro Shigenobu, Kanagawa, both of Japan

[73] Assignee: Sony Corporation, Tokyo, Japan

[21] Appl. No.: 08/940,183

[22] Filed: Sep. 30, 1997

[30] Foreign Application Priority Data

Oct. 2, 1996 [JP] Japan .................................... 8-261990

[51] Int. Cl.[6] .................................................... G11B 7/00

[52] U.S. Cl. ............................................ 369/47; 369/59

[58] Field of Search ............................ 714/763; 348/536, 348/548, 525; 375/366; 369/33, 47, 59, 48, 124; 386/85

[56] References Cited

U.S. PATENT DOCUMENTS

| | | | |
|---|---|---|---|
| 3,928,720 | 12/1975 | Watatani et al. | 348/525 |
| 3,941,930 | 3/1976 | Mohri et al. | 348/525 |
| 4,343,022 | 8/1982 | Tanaka et al. | 386/85 |
| 4,620,300 | 10/1986 | Ogawa | 369/33 |
| 4,766,602 | 8/1988 | Wilkinson et al. | 375/366 |
| 4,868,659 | 9/1989 | Modesitt | 348/548 |
| 5,492,294 | 2/1996 | Evans et al. | 348/536 |

*Primary Examiner*—Albert De Cady
*Assistant Examiner*—David Ton
*Attorney, Agent, or Firm*—Limbach & Limbach L.L.P.

[57] ABSTRACT

A window signal generating circuit generates a window 1 signal in synchronization with a reference counter and generates a window 2 signal by inverting the window 1 signal. If a detected synchronizing signal detected by a synchronizing signal detecting circuit is synchronized with a window 1 signal, a resynchronizing signal output circuit outputs a resynchronizing signal in synchronization with the window 1 signal. If a window 1 signal and a synchronizing signal are not synchronous, that is, if a window 2 signal is at a high level and a synchronizing signal is detected, another reference counter is synchronized with the synchronizing signal, and if a synchronous state continues by a predetermined frequency or more, the reference counter is synchronized with the timing of another reference counter. A synchronizing signal can be promptly fetched by the above processing.

18 Claims, 39 Drawing Sheets

REGENERATIVE RF SIGNAL
1
SYNCHRONIZING SIGNAL DETECTING CIRCUIT
3
REFERENCE COUNTER
a
RESET 2
RESET 1
2
SYNCHRONIZATION JUDGING CIRCUIT
WINDOW 1
4
WINDOW SIGNAL GENERATING CIRCUIT
WINDOW 2
SYNCHRONIZATION JUDGING CIRCUIT
50
WINDOW 3
RESET 3
WINDOW SIGNAL GENERATING CIRCUIT
51
52
REFERENCE COUNTER

ID CODE ENCODING SECTION
24
ECC ENCODING SECTION
26
MODULATING SECTION
27
SRAM
25
MAGNETIC FIELD APPLYING DRIVER
28
29
30
31
REGENERATIVE RF SIGNAL
ENCODING SECTION
DECODING SECTION
a
b
ID CODE DECODING SECTION
35
ECC DECODING SECTION
34
SRAM
33
DEMODULATING SECTION
32

FIG. 1B
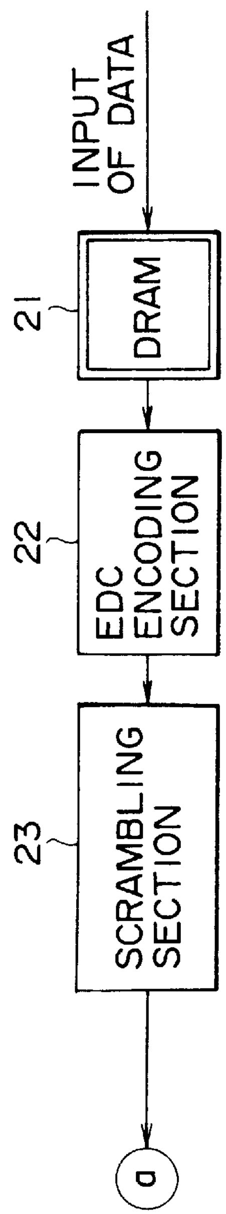
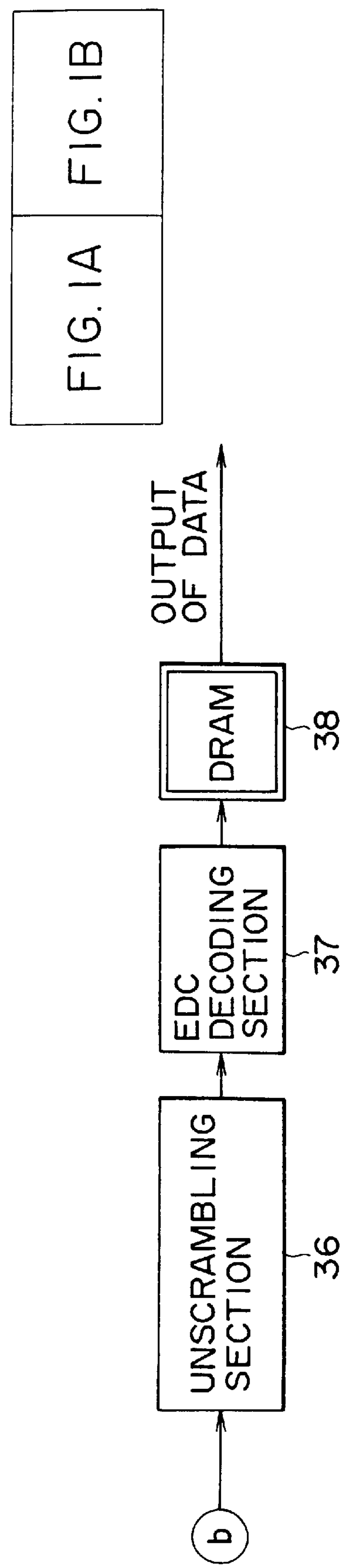

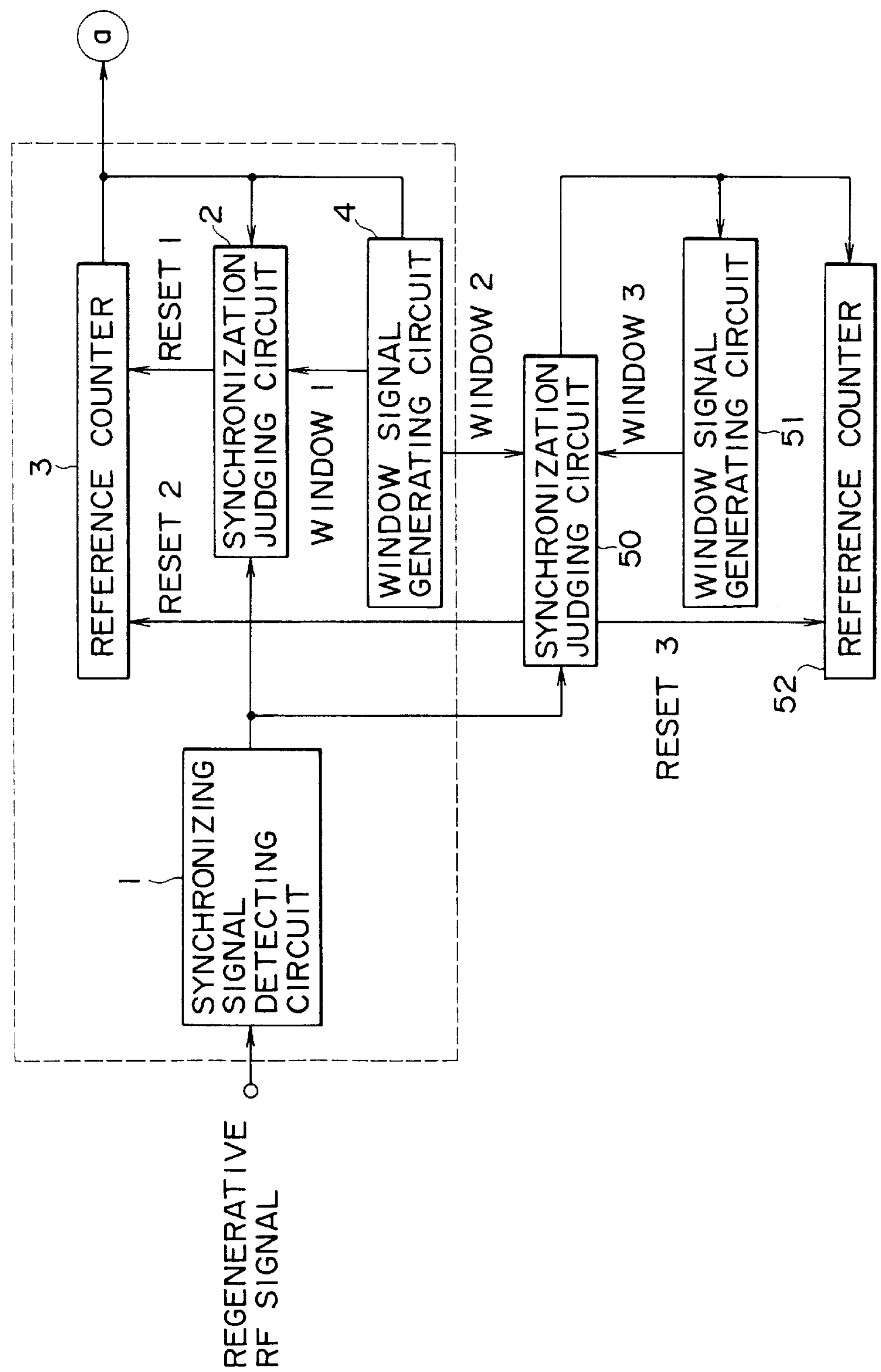
F I G. 2A
REGENERATIVE RF SIGNAL
SYNCHRONIZING SIGNAL DETECTING CIRCUIT
1
REFERENCE COUNTER
3
RESET 1
RESET 2
SYNCHRONIZATION JUDGING CIRCUIT
2
WINDOW 1
WINDOW SIGNAL GENERATING CIRCUIT
4
WINDOW 2
SYNCHRONIZATION JUDGING CIRCUIT
50
WINDOW 3
WINDOW SIGNAL GENERATING CIRCUIT
51
REFERENCE COUNTER
52
RESET 3
a

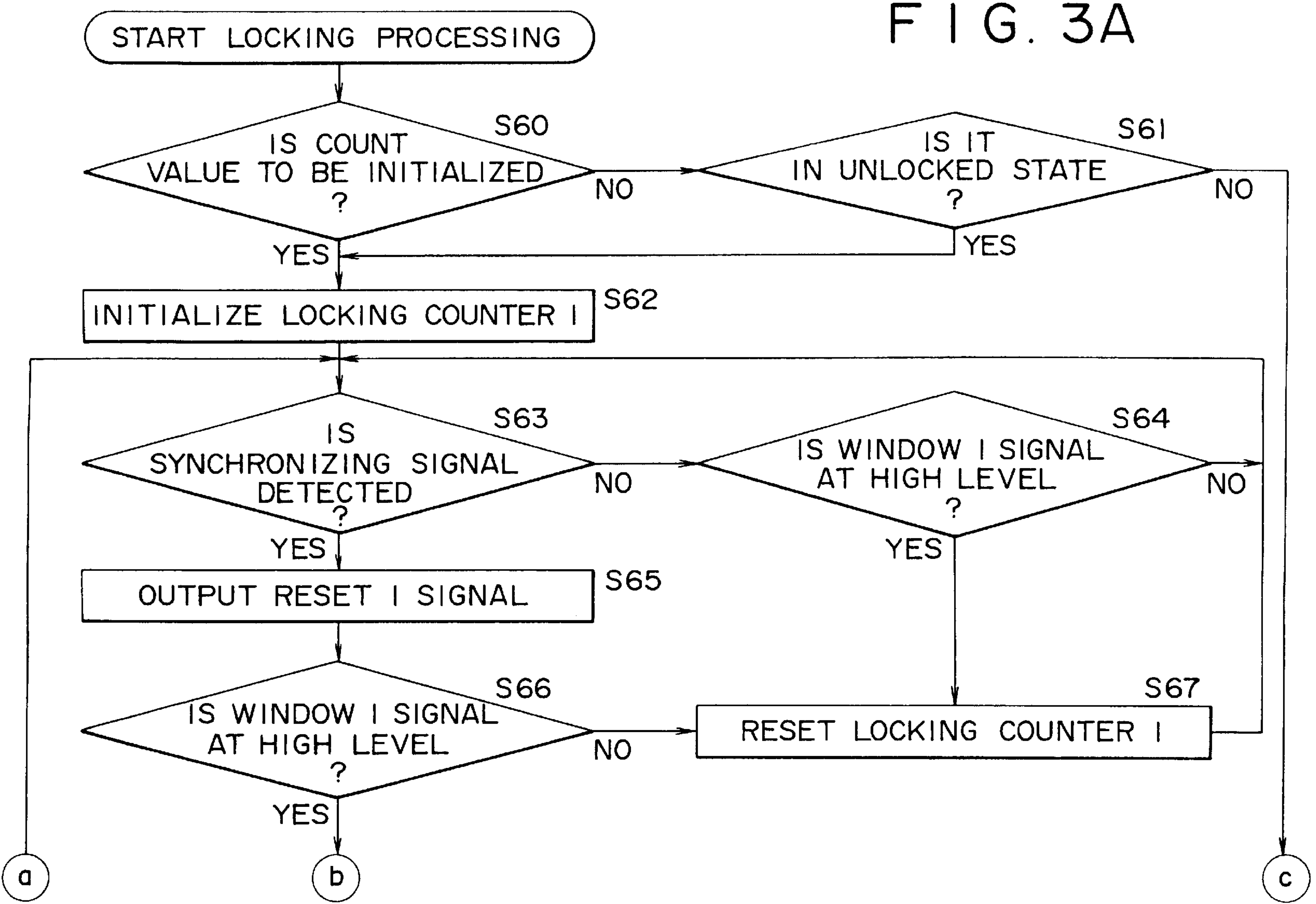
F I G. 3A
START LOCKING PROCESSING
S60
IS COUNT VALUE TO BE INITIALIZED ?
YES
NO
S61
IS IT IN UNLOCKED STATE ?
YES
NO
S62
INITIALIZE LOCKING COUNTER I
S63
IS SYNCHRONIZING SIGNAL DETECTED ?
YES
NO
S64
IS WINDOW I SIGNAL AT HIGH LEVEL ?
YES
NO
S65
OUTPUT RESET I SIGNAL
S66
IS WINDOW I SIGNAL AT HIGH LEVEL ?
YES
NO
S67
RESET LOCKING COUNTER I
a
b
c

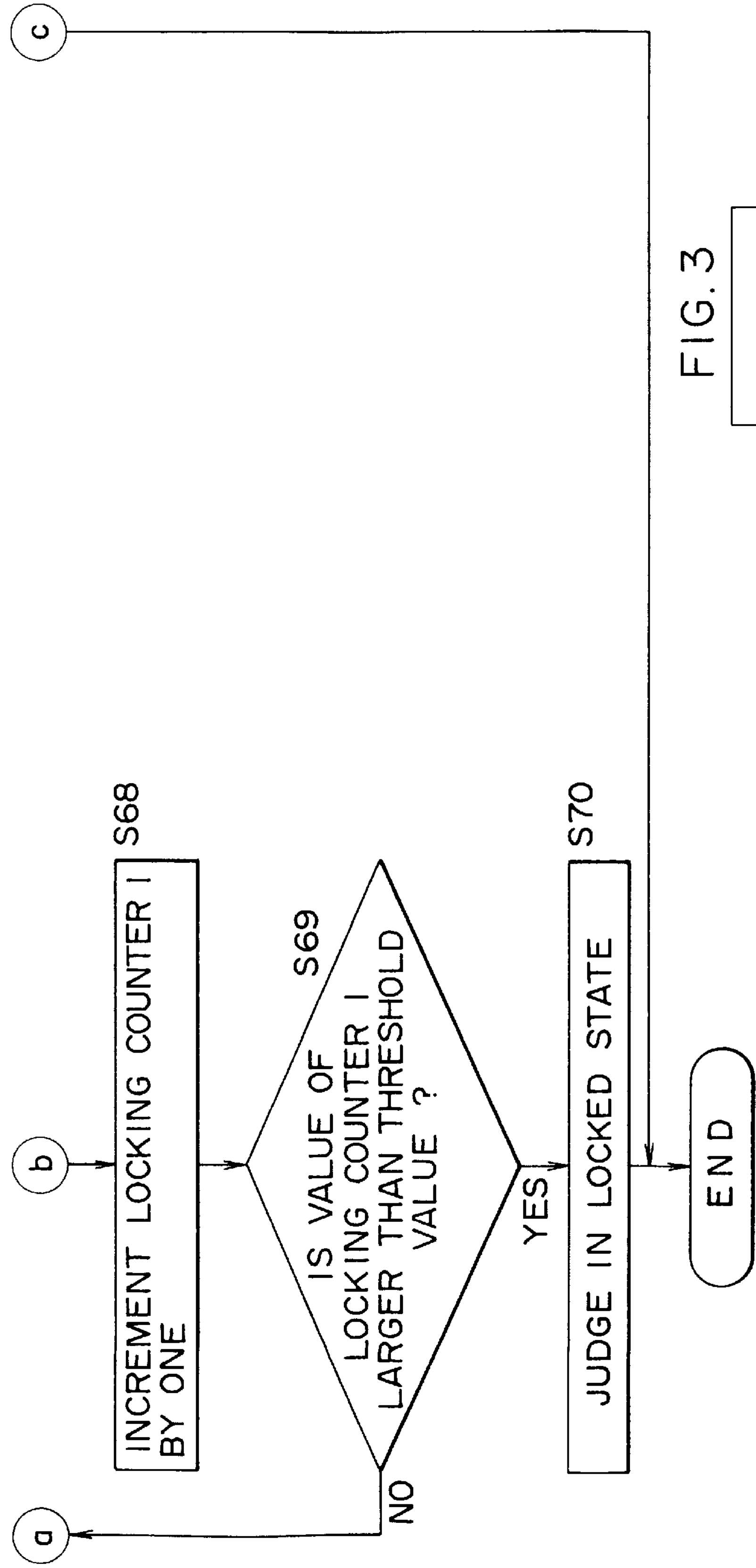
F I G. 3B
b
a
c
S68
INCREMENT LOCKING COUNTER I BY ONE
S69
IS VALUE OF LOCKING COUNTER I LARGER THAN THRESHOLD VALUE ?
YES
NO
S70
JUDGE IN LOCKED STATE
END
FIG. 3
FIG. 3A
FIG. 3B START UNLOCKING PROCESSING
S90
IS UNLOCKING COUNTER I TO BE INITIALIZED ?
YES
NO
S91
INITIALIZE UNLOCKING COUNTER I
S92
IS IT IN LOCKED STATE ?
NO
YES
S93
IS WINDOW I SIGNAL AT HIGH LEVEL ?
NO
YES
S94
IS SYNCHRONIZING SIGNAL DETECTED ?
NO
YES
S95
RESET UNLOCKING COUNTER I AND OUTPUT RESET I SIGNAL
a
b a
b
S104
IS SYNCHRONIZING SIGNAL DETECTED ?
NO
YES
S112
IS WINDOW 3 SIGNAL AT HIGH LEVEL ?
NO
YES
S105
IS WINDOW 3 SIGNAL AT HIGH LEVEL ?
NO
YES
S106
RESET LOCKING COUNTER 2
S107
OUTPUT RESET 3 SIGNAL
S108
INCREMENT LOCKING COUNTER 2 BY ONE
c
d

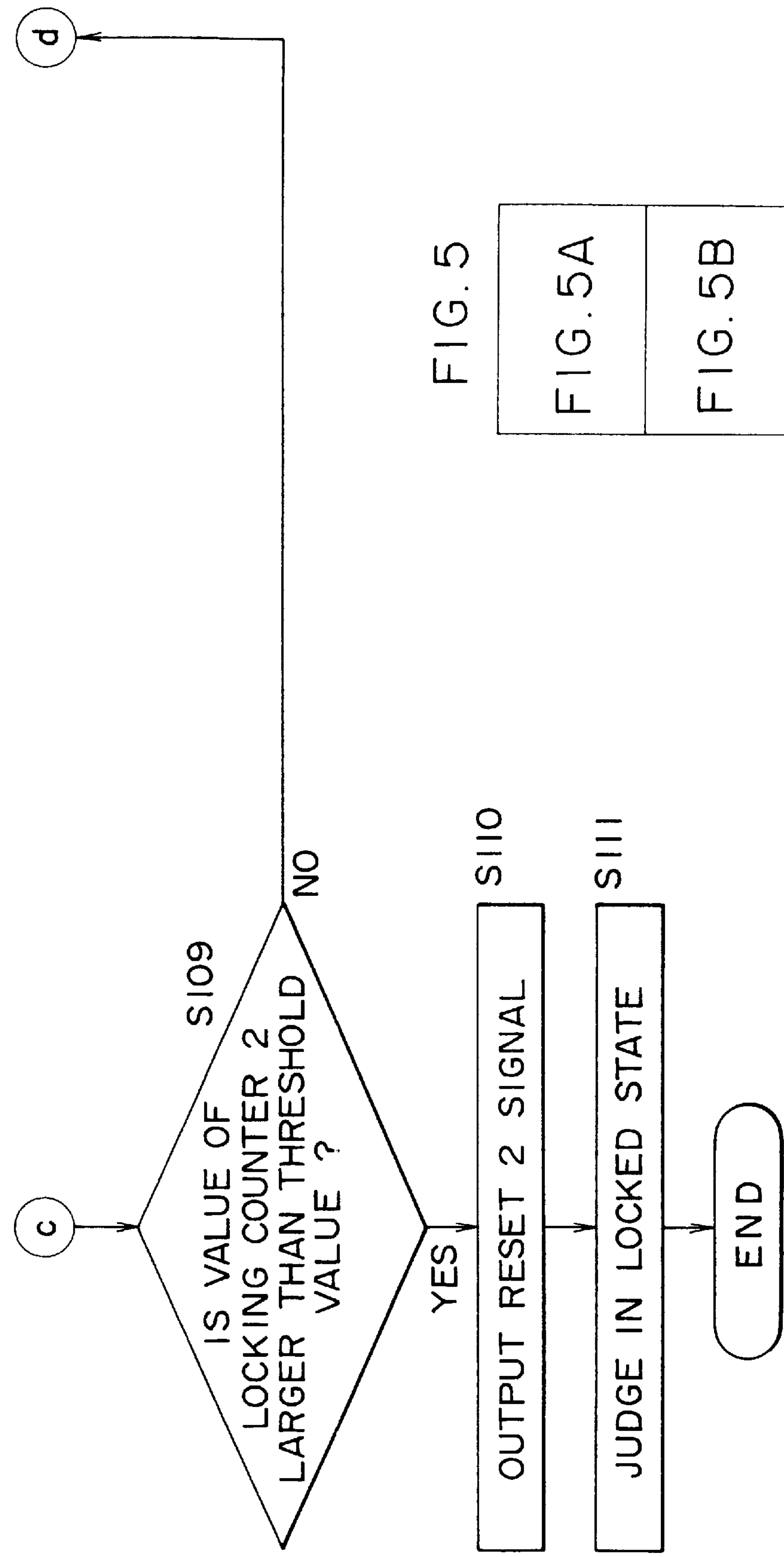
F I G. 5C
c
S109
IS VALUE OF LOCKING COUNTER 2 LARGER THAN THRESHOLD VALUE ?
NO
d
YES
S110
OUTPUT RESET 2 SIGNAL
S111
JUDGE IN LOCKED STATE
END
F I G. 5
F I G. 5A
F I G. 5B
F I G. 5C FIG. 8A DETECTED SYNCHRONIZING SIGNAL
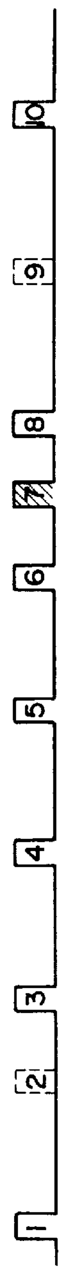
FIG. 8B WINDOW 1 SIGNAL
FIG. 8C WINDOW 2 SIGNAL
FIG. 8D WINDOW 3 SIGNAL
FIG. 8E REGENERATIVE SYNCHRONIZING SIGNAL
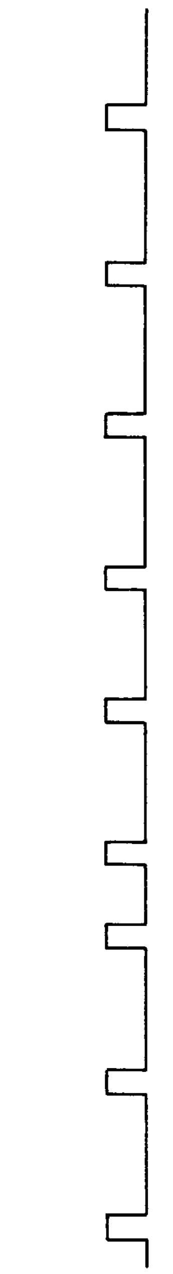
FIG. 8F ERROR DURATION

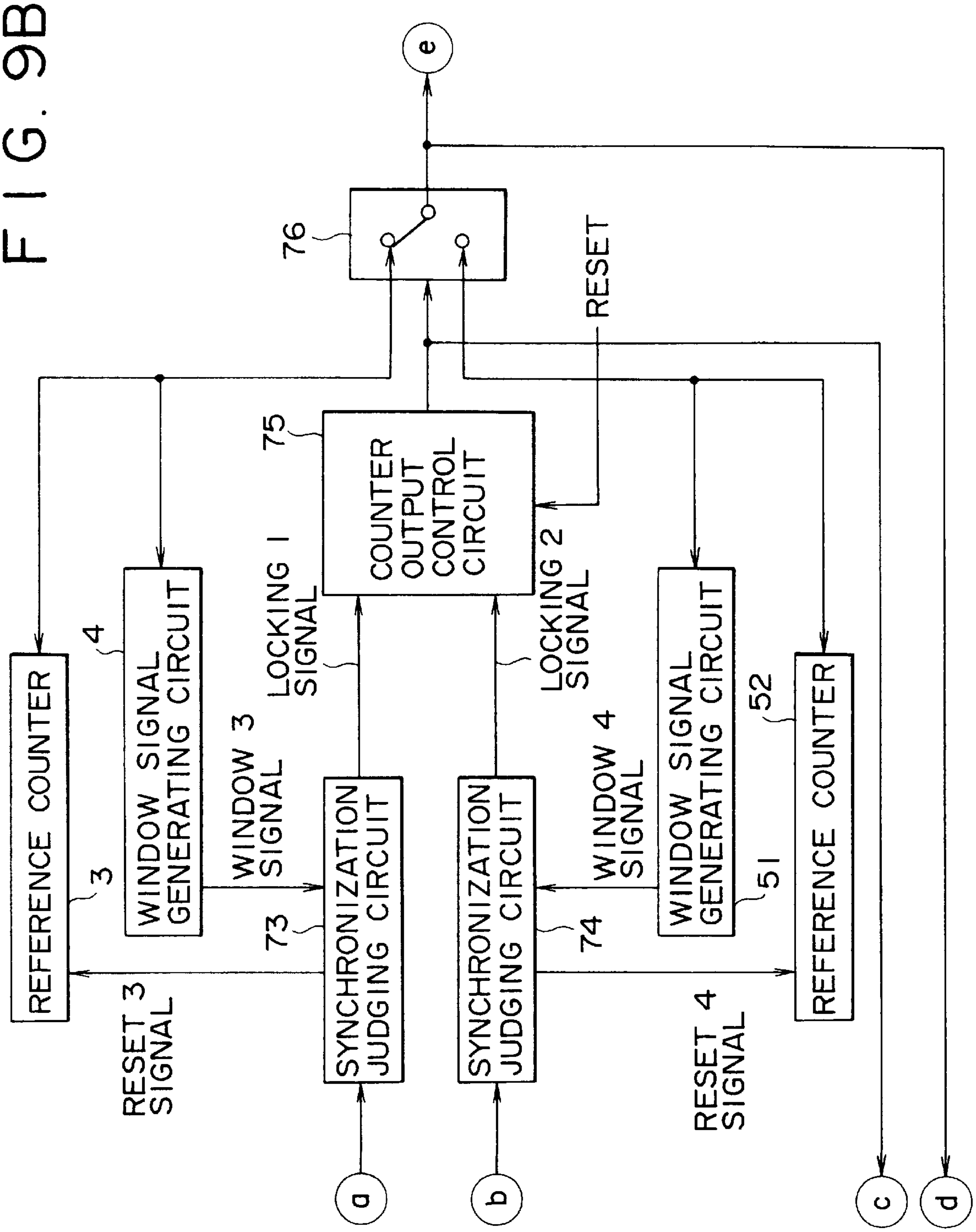
F I G. 9B
REFERENCE COUNTER
3
WINDOW SIGNAL GENERATING CIRCUIT
4
WINDOW 3 SIGNAL
RESET 3 SIGNAL
SYNCHRONIZATION JUDGING CIRCUIT
73
LOCKING 1 SIGNAL
COUNTER OUTPUT CONTROL CIRCUIT
75
76
RESET
SYNCHRONIZATION JUDGING CIRCUIT
74
LOCKING 2 SIGNAL
WINDOW 4 SIGNAL
WINDOW SIGNAL GENERATING CIRCUIT
51
REFERENCE COUNTER
52
RESET 4 SIGNAL
a
b
c
d
e

| FIG. 9A | FIG. 9B | FIG. 9C |
|---|---|---|

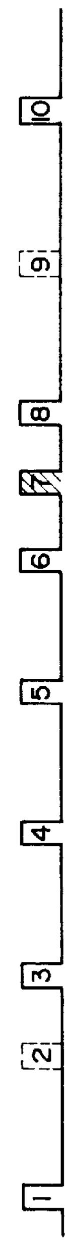
FIG. 10A DETECTED SYNCHRONIZING SIGNAL
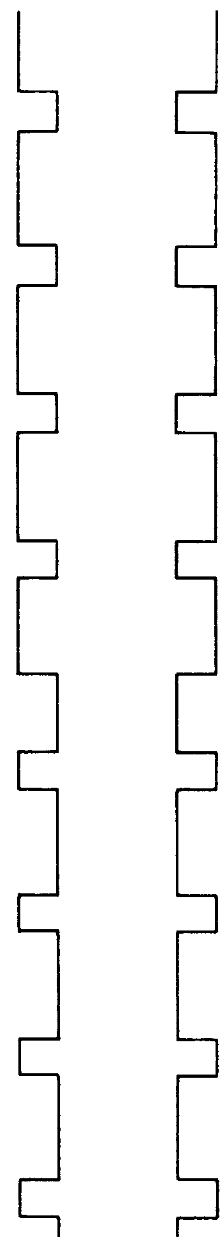
FIG. 10B WINDOW 5 SIGNAL
FIG. 10C WINDOW 6 SIGNAL
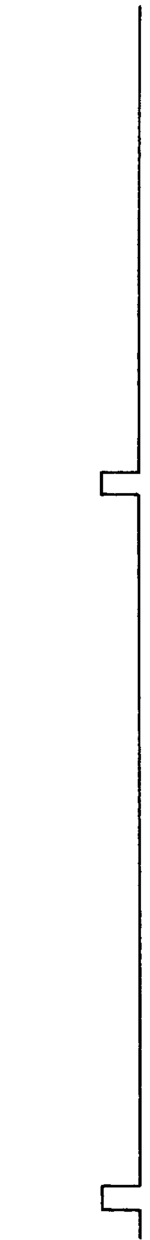
FIG. 10D SYNCHRONIZING SIGNAL 1
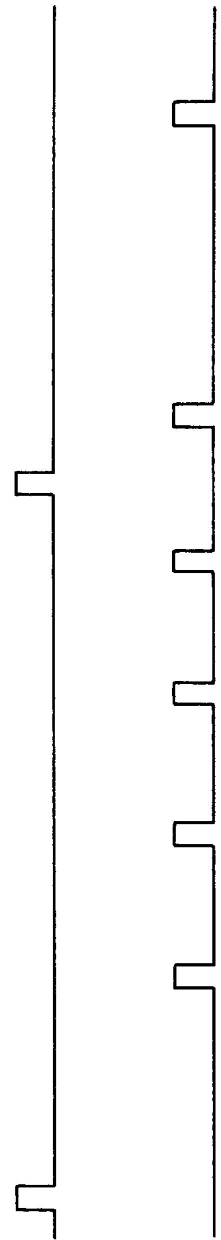
FIG. 10E SYNCHRONIZING SIGNAL 2
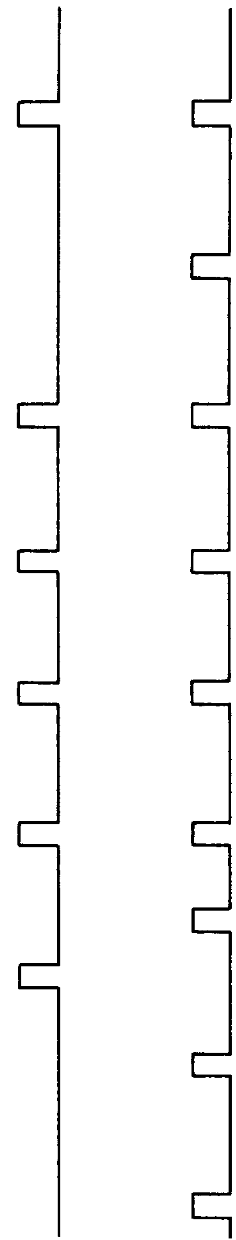
FIG. 10F REGENERATIVE SYNCHRONIZING SIGNAL
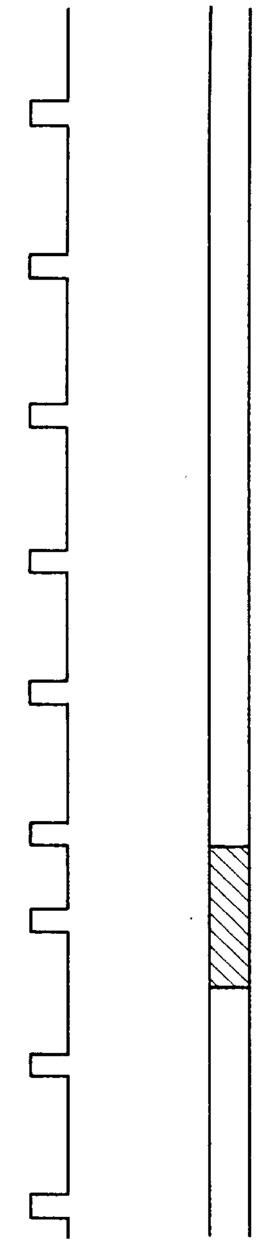
FIG. 10G ERROR DURATION FIG. 11A DETECTED SYNCHRONIZING SIGNAL
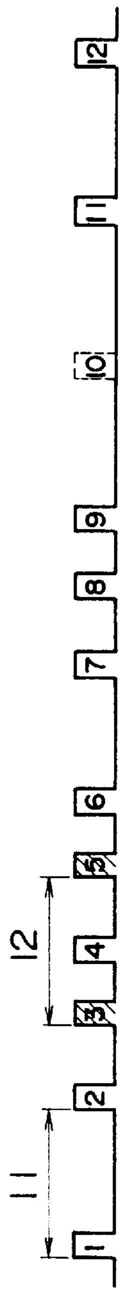
FIG. 11B WINDOW 1 SIGNAL
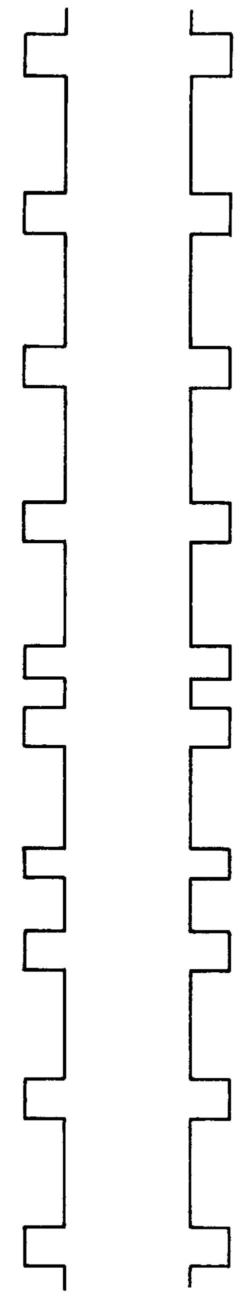
FIG. 11C WINDOW 2 SIGNAL
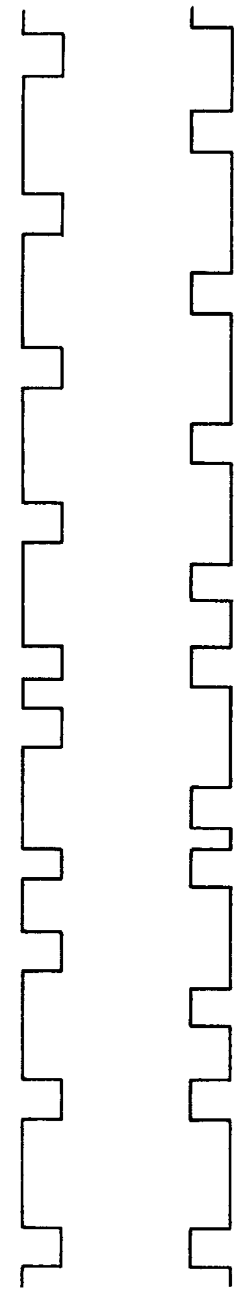
FIG. 11D WINDOW 3 SIGNAL
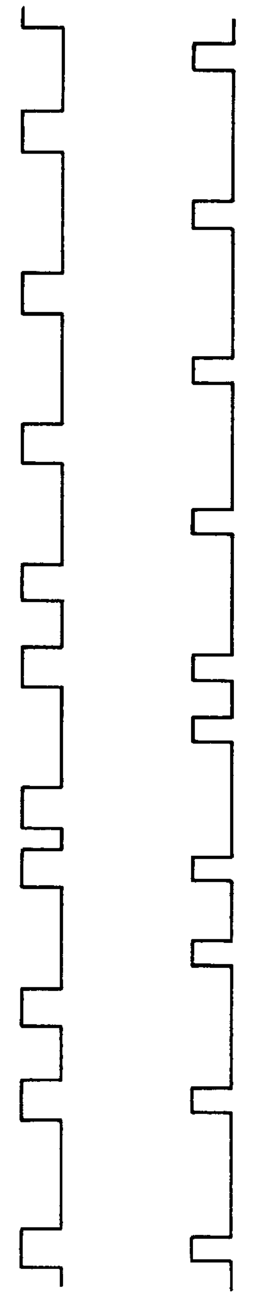
FIG. 11E REGENERATIVE SYNCHRONIZING SIGNAL
FIG. 11F ERROR DURATION
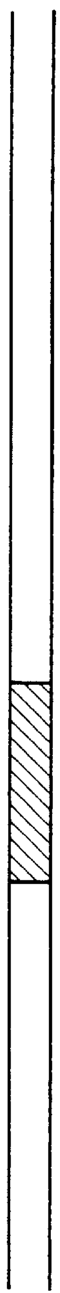

FIG. 12A DETECTED SYNCHRONIZING SIGNAL
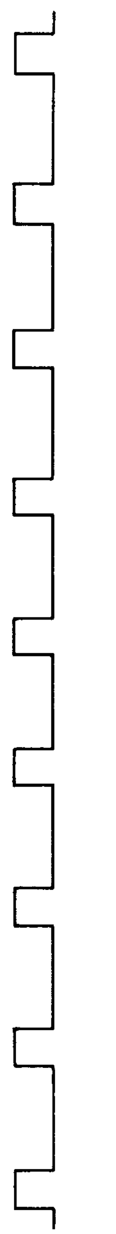
FIG. 12B WINDOW 5 SIGNAL
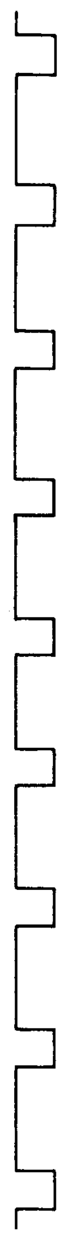
FIG. 12C WINDOW 6 SIGNAL
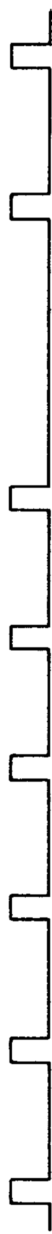
FIG. 12D SYNCHRONIZING SIGNAL 1
FIG. 12E SYNCHRONIZING SIGNAL 2
FIG. 12F REGENERATIVE SYNCHRONIZING SIGNAL
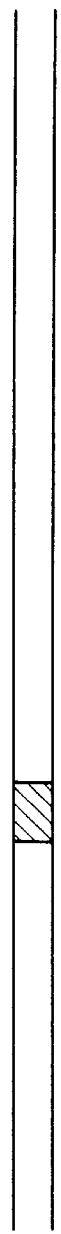
FIG. 12G ERROR DURATION BLOCK 1
ADDRESS COUNTER
93
SET 1 SIGNAL
90
95
REGENERATIVE RF SIGNAL
ADDRESS DETECTING CIRCUIT
DETECTED ADDRESS
ADDRESS OK SIGNAL
ADDRESS JUDGING CIRCUIT
REGENERATIVE ADDRESS
SET 3 SIGNAL
96
TIMING CONTROLLER
91
ADDRESS JUDGING CIRCUIT
SET 2 SIGNAL
94
ADDRESS COUNTER
BLOCK 2

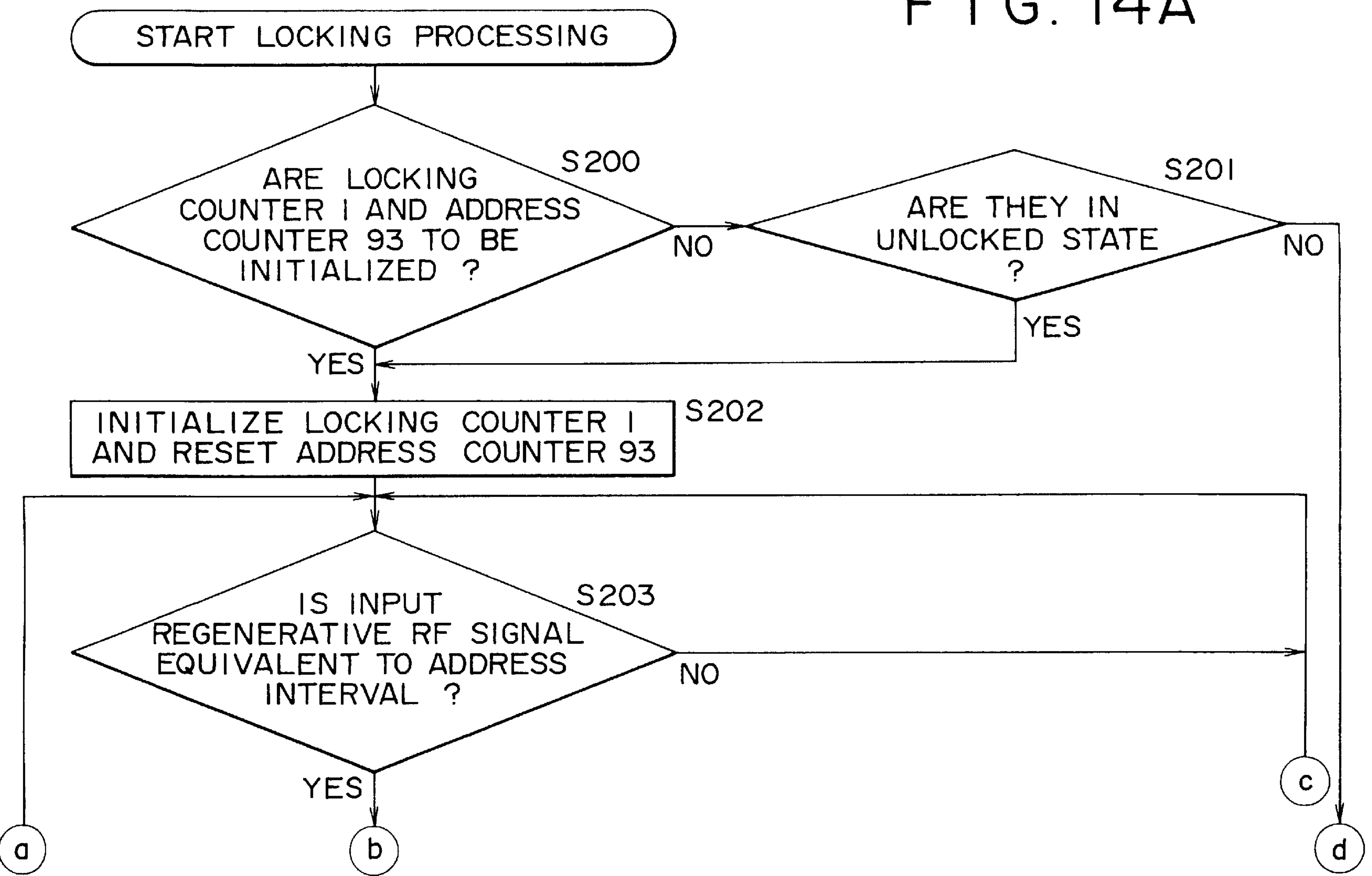
F I G. 14A
START LOCKING PROCESSING
S200
ARE LOCKING COUNTER 1 AND ADDRESS COUNTER 93 TO BE INITIALIZED ?
YES
NO
S201
ARE THEY IN UNLOCKED STATE ?
YES
NO
S202
INITIALIZE LOCKING COUNTER 1 AND RESET ADDRESS COUNTER 93
S203
IS INPUT REGENERATIVE RF SIGNAL EQUIVALENT TO ADDRESS INTERVAL ?
YES
NO
a
b
c
d

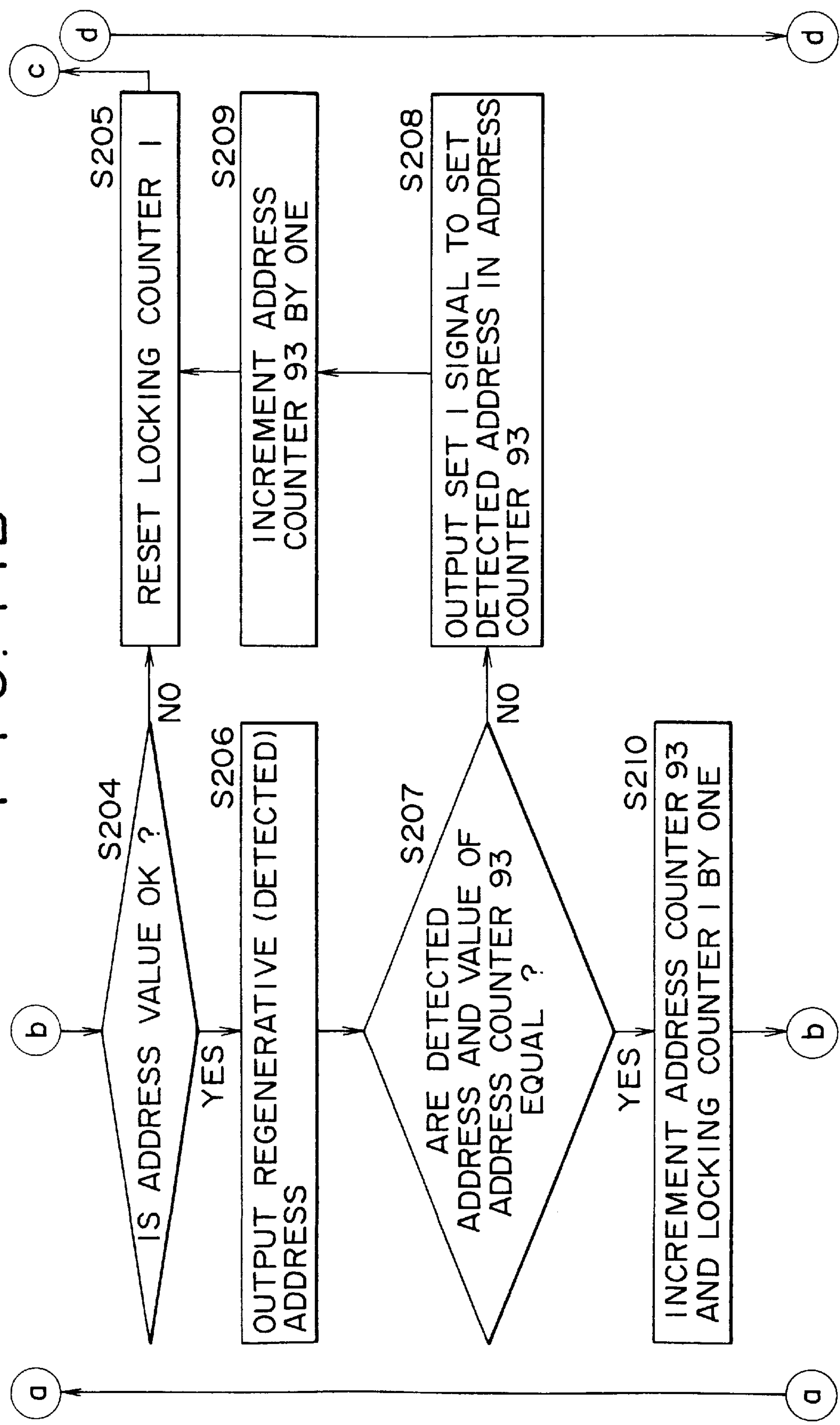
F I G. 14B
b
S204
IS ADDRESS VALUE OK ?
YES
NO
S205
RESET LOCKING COUNTER 1
c
S206
OUTPUT REGENERATIVE (DETECTED) ADDRESS
S207
ARE DETECTED ADDRESS AND VALUE OF ADDRESS COUNTER 93 EQUAL ?
YES
NO
S208
OUTPUT SET 1 SIGNAL TO SET DETECTED ADDRESS IN ADDRESS COUNTER 93
S209
INCREMENT ADDRESS COUNTER 93 BY ONE
S210
INCREMENT ADDRESS COUNTER 93 AND LOCKING COUNTER 1 BY ONE
b
a
a
d
d a
b
d
IS VALUE OF LOCKING COUNTER I LARGER THAN THRESHOLD VALUE ?
S211
NO
YES
S212
JUDGE IN LOCKED STATE
END

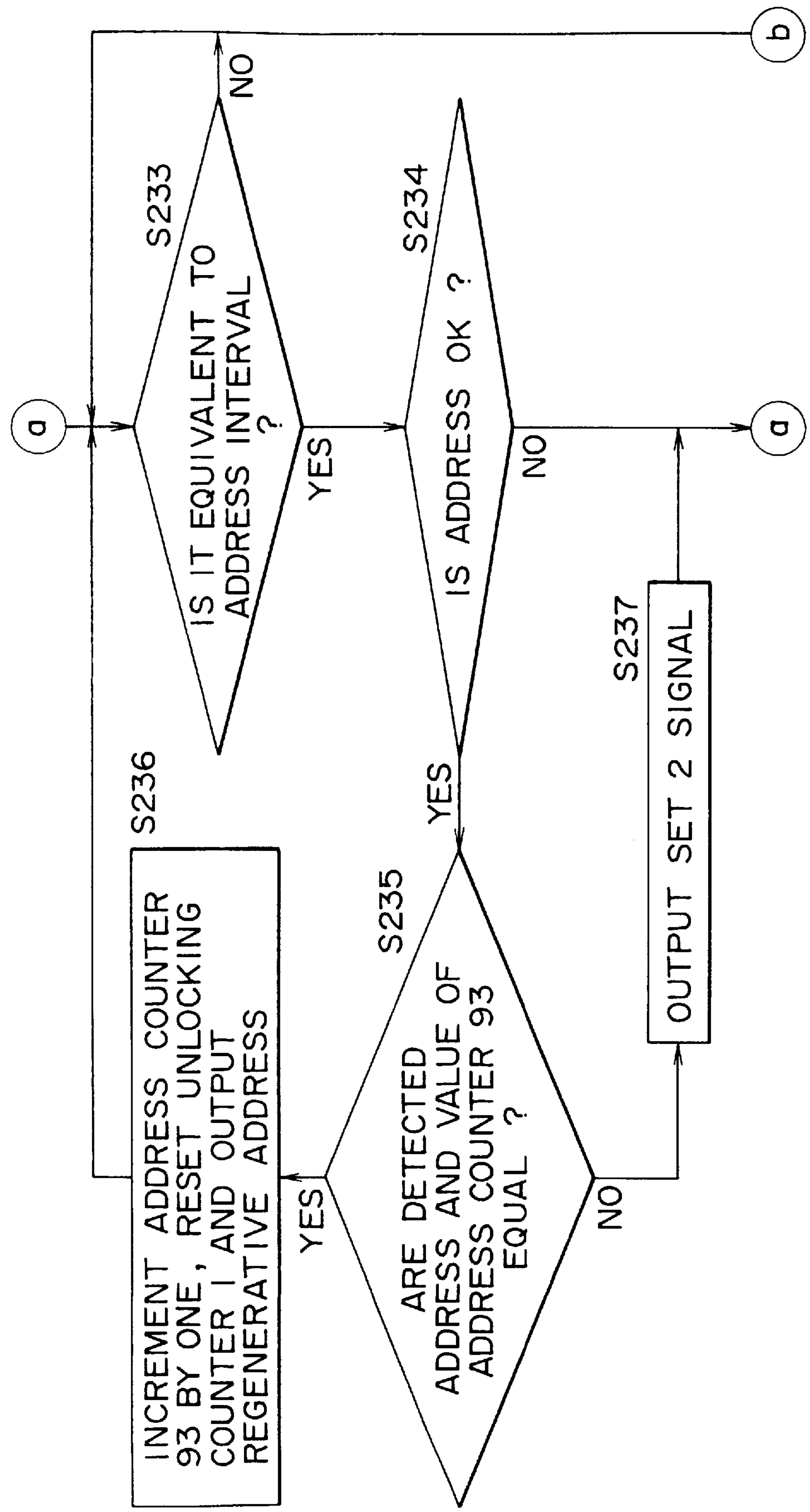
F I G. 15B
a
S233
IS IT EQUIVALENT TO ADDRESS INTERVAL ?
NO
b
YES
S234
IS ADDRESS OK ?
NO
a
YES
S235
ARE DETECTED ADDRESS AND VALUE OF ADDRESS COUNTER 93 EQUAL ?
YES
NO
S236
INCREMENT ADDRESS COUNTER 93 BY ONE, RESET UNLOCKING COUNTER I AND OUTPUT REGENERATIVE ADDRESS
S237
OUTPUT SET 2 SIGNAL

| FIG. 15A |
| --- |
| FIG. 15B |
| FIG. 15C |

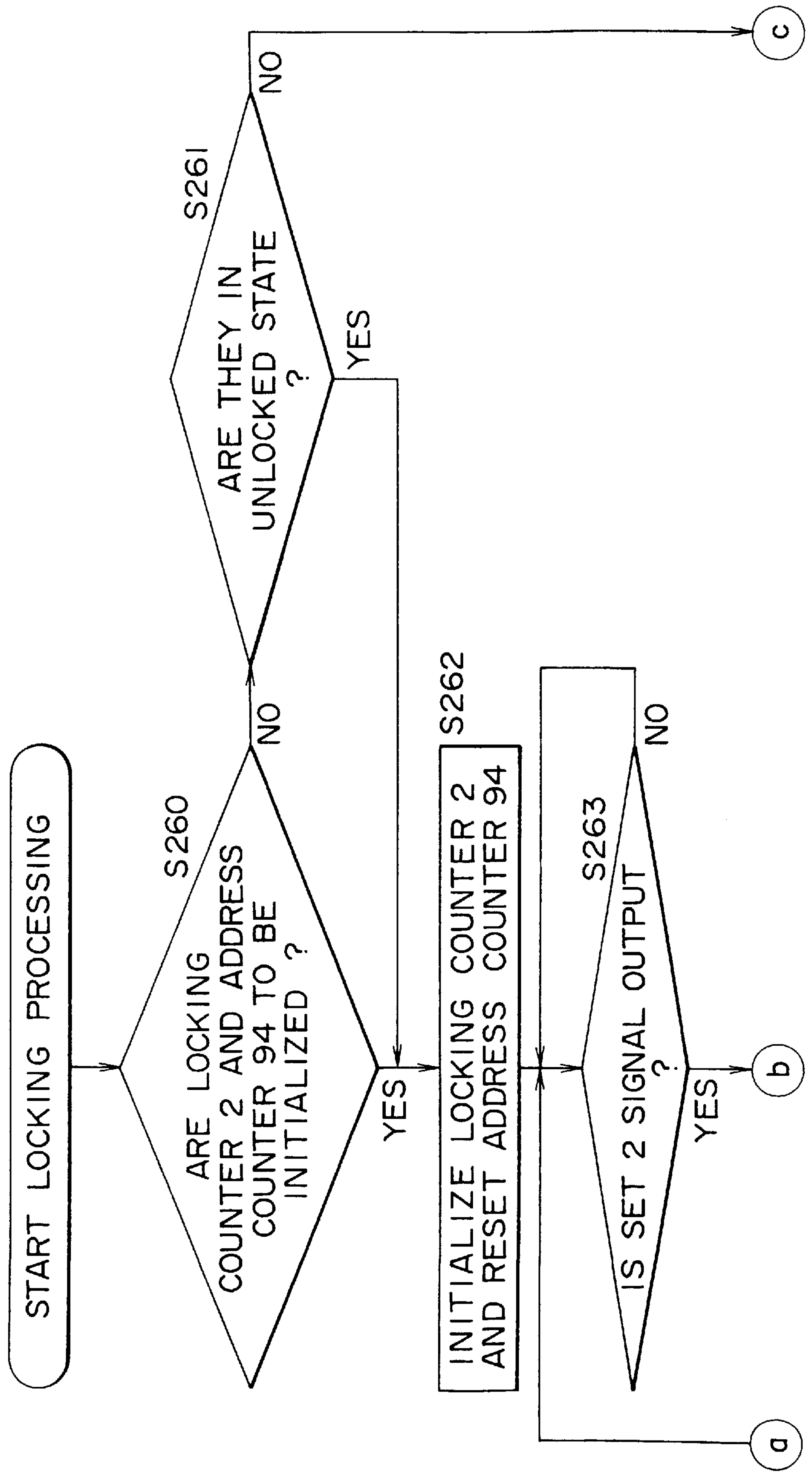
F I G. 16A
START LOCKING PROCESSING
S260
ARE LOCKING COUNTER 2 AND ADDRESS COUNTER 94 TO BE INITIALIZED ?
YES
NO
S261
ARE THEY IN UNLOCKED STATE ?
YES
NO
c
S262
INITIALIZE LOCKING COUNTER 2 AND RESET ADDRESS COUNTER 94
S263
IS SET 2 SIGNAL OUTPUT ?
YES
NO
b
a a
b
c
S264
ARE DETECTED ADDRESS AND VALUE OF ADDRESS COUNTER 94 EQUAL ?
NO
YES
S265
INCREMENT LOCKING COUNTER 2 BY ONE
S266
RESET LOCKING COUNTER 2
S267
SET DETECTED ADDRESS IN ADDRESS COUNTER 94
S268
INCREMENT ADDRESS COUNTER 94 BY ONE S269
IS VALUE OF LOCKING COUNTER 2 LARGER THAN THRESHOLD VALUE ?
YES
NO
S270
OUTPUT SET 3 SIGNAL TO SET DETECTED ADDRESS IN ADDRESS COUNTER 93
S271
JUDGE IN LOCKED STATE
END
a
b
c

DETECTED ADDRESS
0 1 2 ? 4 5 7 8 9 10 11 ....

OUTPUT OF ADDRESS COUNTER
0 1 2 3 4 5 6 7 8 9 11 ....

ERROR DURATION

Figures 18A, 18B, 18C, 18D:
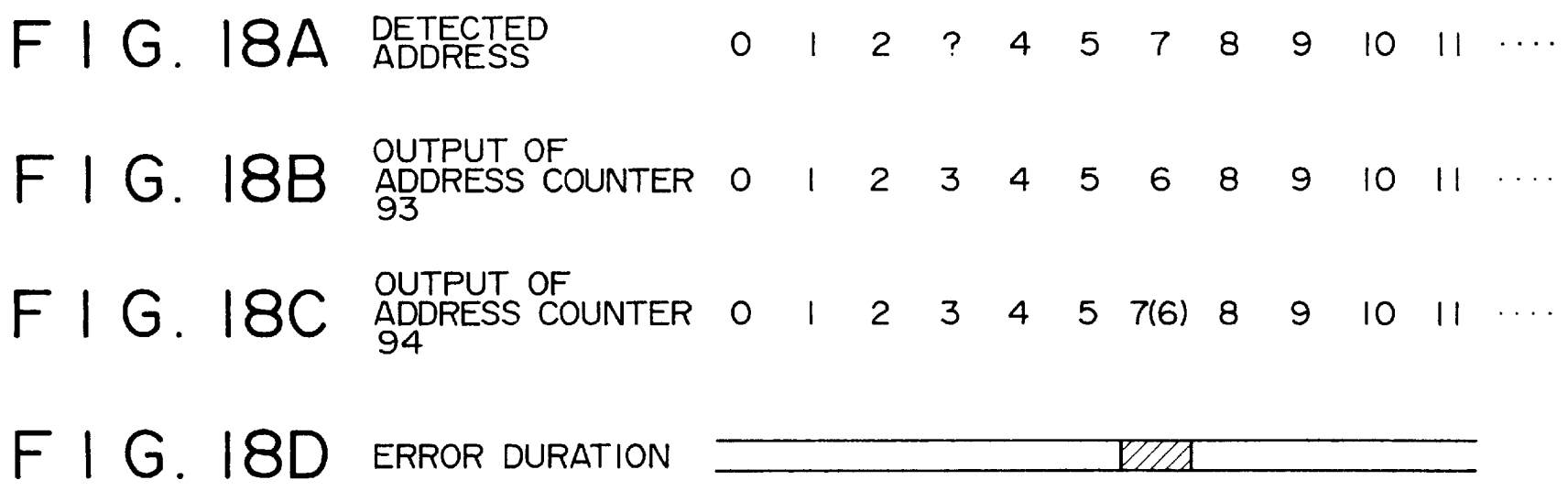

FIG. 18A DETECTED ADDRESS 0 1 2 ? 4 5 7 8 9 10 11 .....

FIG. 18B OUTPUT OF ADDRESS COUNTER 93 0 1 2 3 4 5 6 8 9 10 11 .....

FIG. 18C OUTPUT OF ADDRESS COUNTER 94 0 1 2 3 4 5 7(6) 8 9 10 11 .....

FIG. 18D ERROR DURATION

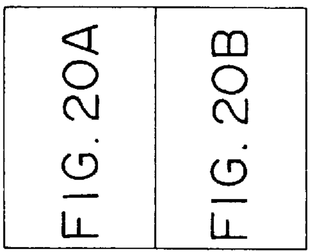
FIG. 20A
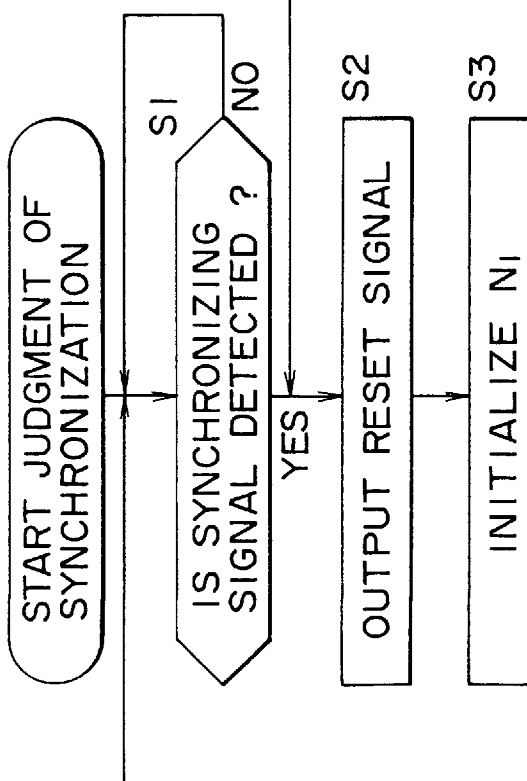

FIG. 23A DETECTED SYNCHRONIZING SIGNAL
FIG. 23B WINDOW SIGNAL
FIG. 23C REGENERATIVE SYNCHRONIZING SIGNAL
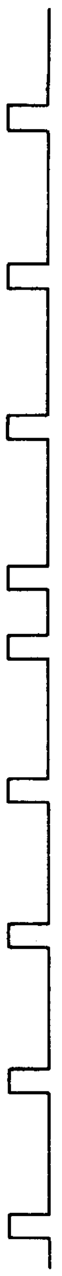
FIG. 23D ERROR DURATION
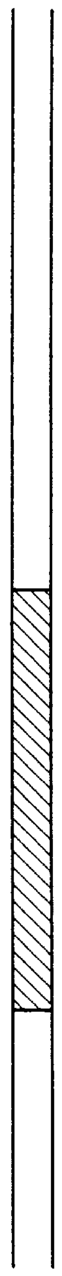

METHOD FOR REGENERATING SYNCHRONIZING SIGNAL BY JUDGING WHETHER OR NOT THE EXTRACTED SYNCHRONIZING SIGNAL INCLUDES THE SECOND AND THIRD WINDOW SIGNALS

BACKGROUND OF THE INVENTION

1. Field of the Invention

The present invention relates to a regenerator and the regenerating method, particularly relates to a regenerator for regenerating information according to an inserted signal such as a synchronizing signal or an address signal periodically inserted into information recorded on a recording medium or information transmitted via a transmission medium and the regenerating method.

2. Description of the Related Art

In a conventional type recording medium recording regenerator, when digital data is recorded on a recording medium, it is recorded after the data is divided into frames of predetermined length and a synchronizing signal for showing the separation of an individual frame is inserted between frames.

In case such recorded data is regenerated, after information is read in units of frame from a recording medium, referring to a synchronizing signal and error correction and others are executed using the read frame as a basic unit, original data is regenerated.

Therefore, to precisely execute error correction for data read from the recording medium, in the conventional type recording medium recording regenerator, a synchronizing signal is required to be precisely detected and a frame functioning as a basic unit is required to be securely extracted.

FIG. 19 shows an example of the constitution of a resynchronizing device for detecting a synchronizing signal and correcting the timing of the detected synchronizing signal in a conventional type recording medium recording regenerator.

As shown in FIG. 19, a synchronizing signal detecting circuit 1 detects a synchronizing signal included in a regenerative RF signal read from a recording medium not shown. A synchronization judging circuit 2 judges whether the timing of a synchronizing signal is normal or not, referring to a window signal output from a window signal generating circuit 4. A reference counter 3 counts for example, from a value zero to a value 1000 repeatedly (returns to zero if a count value reaches 1000 and repeats counting) and supplies the output to the synchronization judging circuit 2 and the window signal generating circuit 4. The reference counter 3 is reset by a reset signal output from the synchronization judging circuit 2.

Referring to a count value output from the reference counter 3, the window signal generating circuit 4 changes a window signal to a high level at timing at which the output value is 990 and changes the window signal to a low level at timing at which the output value is 10. A resynchronizing signal output circuit 5 outputs a resynchronizing signal at timing at which a count value output from the reference counter 3 is zero.

Next, referring to flowcharts shown in FIGS. 20 to 22 and a timing chart shown in FIG. 23, operation in the prior example shown in FIG. 19 will be described.

FIG. 20 shows an example of processing that the synchronization judging circuit 2 shown in FIG. 19 executes. When this processing is executed, the synchronization judging circuit 2 judges whether a synchronizing signal is detected or not by the synchronizing signal detecting circuit 1 in a step S1. As a result, if it is judged that a synchronizing signal is not detected (NO), processing is returned to the step S1 and the same processing is repeated until a synchronizing signal is detected. If it is judged that a synchronizing signal is detected (YES), processing proceeds to a step S2.

In the step S2, the synchronization judging circuit 2 outputs a reset signal to the reference counter 3. As a result, a count value of the reference counter 3 is reset to zero. Next, processing proceeds to a step S3 and a variable $N_1$ is initialized to zero.

In the next step S4, it is judged whether a synchronizing signal is detected by the synchronizing signal detecting circuit 1 or not. As a result, if it is judged that a synchronizing signal is not detected (NO), processing proceeds to a step S6. If it is judged that a synchronizing signal is detected (YES), processing proceeds to a step S5.

In the step S5, if a synchronizing signal is detected in a window, processing is returned to the step S2 and the same processing is repeated. If a synchronizing signal is detected outside a window, processing is returned to the step S4 and the same processing is repeated.

In the step S4, if it is judged that a synchronizing signal is not detected (NO), processing proceeds to the step S6. In the step S6, if a synchronizing signal is not detected in a window, processing is returned to the step S4 and the same processing is repeated. If a synchronizing signal is not detected outside a window, processing proceeds to a step S7.

In the step S7, the synchronization judging circuit 2 outputs a reset signal to the reference counter 3. As a result, a count value of the reference counter 3 is reset to zero.

In the next step S8, the value of the variable $N_1$ is incremented by one. In a step S9, it is judged whether the value of the variable $N_1$ is 4 or more or not and as a result, if it is judged that the value of the variable $N_1$ is 4 or more (YES), processing is returned to the step S1 and the same processing is repeated. In the step S9, if it is judged that the value of the variable $N_1$ is smaller than 4 (NO), processing is returned to the step S4 and the same processing is repeated.

FIG. 21 is a flowchart for explaining processing for generating a window signal. The processing is executed by the window signal generating circuit 4 shown in FIG. 19. When the processing is executed, the window signal generating circuit 4 judges whether a count value of the reference counter 3 is 990 or not in a step S20. As a result, if it is judged that a count value of the reference counter 3 is not 990 (NO), processing is returned to the step S20 and the same processing is repeated. If it is judged that a count value of the reference counter 3 is 990 (YES), processing proceeds to a step S21.

In the step S21, the window signal generating circuit 4 changes the output to a high level. Processing proceeds to a step S22 and the window signal generating circuit judges whether a count value of the reference counter 3 is 10 or not. As a result, if it is judged that a count value of the reference counter 3 is not 10 (NO), processing is returned to the step S22 and the same processing is repeated. If it is judged that a count value is 10 (YES), processing proceeds to a step S23.

In the step S23, the window signal generating circuit 4 changes a window signal to a low level. Processing is returned to the step S20 and the same processing is repeated.

The window signal generating circuit 4 is changed to a high level, generates and outputs a window signal shown in FIG. 23B by the above processing only while a count value of the reference counter 3 is between 990 and 1000 and between 0 and 10.

FIG. 22 is a flowchart for explaining processing executed in the resynchronizing signal output circuit 5 shown in FIG. 19 for generating a resynchronizing signal.

When this processing is executed, the resynchronizing signal output circuit 5 judges whether a count value of the reference counter is zero or not in a step S40. As a result, if it is judged that the value of the reference counter 3 is not zero (NO), processing is returned to the step S40 and the same processing is repeated. If it is judged that a count value of the reference counter 3 is zero (YES), processing proceeds to a step S41.

In the step S41, the resynchronizing signal output circuit 5 changes the output to a high level for a predetermined period, processing is returned to the step S40 and the same processing is repeated.

The resynchronizing signal output circuit 5 is changed to a high level for a predetermined period at timing at which a count value of the reference counter 3 is zero by the above processing. The resynchronizing signal output circuit outputs a resynchronizing signal shown in FIG. 23C.

Next, referring to the timing chart shown in FIG. 23, the above flowcharts will be described in the concrete. Suppose that a detected synchronizing signal shown in FIG. 23A is output by the synchronizing signal detecting circuit 1 shown in FIG. 19. When the zeroth detected synchronizing signal not shown is input to the synchronization judging circuit 1, it is judged in the step S1 that a synchronizing signal is detected (YES), processing proceeds to the step S2 and the reference counter 3 is reset. In the step S3, the value is the variable $N_1$ is initialized to zero.

In the step S4, it is judged whether a synchronizing signal is detected or not. Assuming that a first synchronizing signal shown in FIG. 23A is input, it is judged in the step S4 that a synchronizing signal is detected (YES) and processing proceeds to the step S5. In the step S5, it is judged whether the value of the reference counter 3 is 990 or more or not. Assuming that the zeroth and first synchronizing signals are input in a normal cycle, while the processing in the steps 4 and 6 is repeated, a synchronizing signal is detected (YES) in the step S4 and processing proceeds to the step S5. In the step S5, it is judged that a synchronizing signal is detected in a window, processing is returned to the step S2 and the same processing is repeated.

Next, assuming that a second synchronizing signal is not detected due to anything at time for the second synchronizing signal to be detected, it is judged in the step S6 that a synchronizing signal is detected in a window (YES) and processing proceeds to the step S7.

In the step S7, the reference counter 3 is reset. At that time, in the resynchronizing signal output circuit 5, the processing shown in FIG. 22 is executed and as a result, at timing at which the reference counter 3 is reset (a count value is reset to zero), a resynchronizing signal (a pulse shown in FIG. 23C) is output.

Therefore, in the above prior example, a window signal is generated, a place for a synchronizing signal to be detected is instructed based upon a count value of the reference counter 3 and if a synchronizing signal is not detected in the place instructed by the window signal, the resynchronizing signal output circuit 5 outputs a resynchronizing signal. Therefore, as a synchronizing signal can be interpolated even if a synchronizing signal is not detected due to anything, data read from a recording medium can be regenerated.

A case in which a time lag is caused between timing at which a synchronizing signal is regenerated and timing at which a window signal is changed to a high level due to the jump of a track and others in the above conventional type resynchronizing device will be described.

If a third synchronizing signal shown in FIG. 23A is input at timing different from the pulse of a window signal shown in FIG. 23B, a regenerative synchronizing signal shown in FIG. 23C is not output at the timing at which the third detected synchronizing signal is input and is output at the same timing as a third window signal. Therefore, in that case, a time lag occurs between a detected synchronizing signal read from a recording medium and a regenerative synchronizing signal output from a resynchronizer.

In such a situation, in this prior example, when no synchronizing signal is detected sequentially four times at timing at which a window signal is changed to a high level, the window signal is kept at a high level and synchronization is again executed.

That is, in the flowchart shown in FIG. 20, if a case (a case in which a time lag occurs between the timing of a detected synchronizing signal and a window signal) in which it is judged that no synchronizing signal is detected (NO) in the step S4 and that no synchronizing signal is detected in a window in the step S6 continues four times or more ($N_1 \geqq 4$), it is judged YES in the step S9, processing is returned to the step S1 and the reference counter 3 is reset. As a result, a window signal shown in FIG. 23B is kept at a high level until a sixth detected synchronizing signal is input.

As it is judged YES in the step S1, processing proceeds to the step S2 and a count value of the reference counter 3 is reset to zero when the sixth detected synchronizing signal is input, the timing of a window signal and a detected synchronizing signal is synchronous.

Therefore, as in the above conventional type resynchronizer, the timing of a detected synchronizing signal and a regenerative synchronizing signal is not synchronous for a period shown in FIG. 23D since the third detected synchronizing signal in which the jump of a track and others occur is input until the sixth detected synchronizing signal is input, there is a problem that data read from a recording medium cannot be precisely regenerated during the above period.

SUMMARY OF THE INVENTION

The present invention is made in view of such a situation and according to the present invention, even if a synchronizing signal is not precisely regenerated from a recording medium, a resynchronizing signal is generated and even if a time lag is caused at timing at which a synchronizing signal is read due to the jump of a track and others, data can be precisely regenerated.

A regenerator according to one aspect of the present invention comprises detection means for detecting an inserted signal which is periodically inserted into information, first count means for counting in the same cycle as a cycle in which an inserted signal is detected, second count means for counting at different timing in the same cycle as the first count means and inserted signal generating means for generating a new inserted signal according to timing at which an inserted signal is detected by the detection means and the timing of count by the first and second count means.

A regenerating method according to another aspect of the present invention comprises the steps of a detection step for detecting an inserted signal which is periodically inserted into information, a first count step for counting in the same cycle as a cycle in which an inserted signal is detected, a second count step for counting at different timing in the same cycle as the first count step and an inserted signal generation step for generating a new inserted signal according to timing at which an inserted signal is detected in the detection step and the timing of count in the first and second count steps.

According to another aspect of the present invention, in the regenerator an inserted signal which is periodically inserted into information is detected by the detection means, the first count means counts in the same cycle as a cycle in which an inserted signal is detected, the second count means counts at different timing in the same cycle as the first count means and a new inserted signal is generated by the inserted signal generating means according to timing at which an inserted signal is detected by the detection means and the timing of count by the first and second count means. For example, if a synchronizing signal recorded on a recording medium in a predetermined cycle is detected by the detection means and timing at which the detection means detects a synchronizing signal and the timing of count by the first count means are synchronous, the inserted signal generating means outputs a synchronizing signal in synchronization with the first count means. If timing at which the detection means detects a synchronizing signal and the timing of count by the first count means are not synchronous, the timing of count by the second count means is synchronized with timing at which the detection means detects a synchronizing signal and then, when these timings are synchronous sequentially twice or more for example, the timing of count by the first count means is synchronized with the timing of count by the second count means and the inserted signal generating means generates a resynchronizing signal in synchronization with the timing of the first counter.

According to another aspect of the invention, in the regenerating method the detection step detects an inserted signal which is periodically inserted into information, the first count step counts in the same cycle as a cycle in which an inserted signal is detected, the second count step counts at different timing in the same cycle as the first count step and an inserted signal generation step generates a new inserted signal according to timing at which an inserted signal is detected by the detection step and the timing of count by the first and second count steps. For example, if a synchronizing signal recorded on a recording medium in a predetermined cycle is detected by the detection step and the detection step is synchronized with timing at which a synchronizing signal is detected and the timing of count in the first count step, the inserted signal generation step outputs a synchronizing signal in synchronization with the first count step. If the detection step is not synchronized with timing at which a synchronizing signal is detected and the timing of count in the first count step, the timing of count in the second count step is synchronized with timing at which the detection step detects a synchronizing signal and then, when these timings are synchronous sequentially twice or more for example, the timing of count in the first count step is synchronized with the timing of count in the second count step and the inserted signal generation step generates a resynchronizing signal in synchronization with the timing of the first count step.

BRIEF DESCRIPTION OF THE DRAWINGS

FIGS. 1 and 1A–1B are block diagrams showing the constitution of an embodiment of a regenerator according to the present invention;

FIGS. 2 and 2A–2B are block diagrams showing the constitution of the embodiment of the regenerator according to the present invention;

FIGS. 3 and 3A–3B are flowcharts for explaining an example of locking processing executed by a synchronization judging circuit 3 shown in FIG. 2;

FIGS. 5 and 5A–5C are flowcharts for explaining locking processing executed by a synchronization judging circuit 50 shown in FIG. 2;

FIGS. 8A–8F are timing charts showing the timing of a signal in a principal part in the block diagram shown in FIG. 2;

FIGS. 9 and 9A–9C are block diagrams showing another embodiment of the regenerator according to the present invention;

FIGS. 10A–10G are timing charts showing the timing of a signal in the principal part of the embodiment shown in FIG. 9;

FIGS. 11A–11F are timing charts showing the timing of a signal in the principal part of the embodiment shown in FIG. 2;

FIGS. 12A–12G are timing charts showing another timing of a signal in the principal part of the embodiment shown in FIG. 9;

FIGS. 15 and 15A–15C are flowcharts for explaining an example of unlocking processing executed by the address judging circuit 95 shown in FIG. 13;

FIGS. 18A–18D explain an example of the operation of the embodiment shown in FIG. 13;

FIGS. 20 and 20A–20B are flowcharts for explaining an example of processing executed by a synchronization judging circuit 2 shown in FIG. 19;

FIGS. 23A–23D are timing charts showing the timing of a signal in a principal part in an example of prior art shown in FIG. 19.

DESCRIPTION OF THE PREFERRED EMBODIMENTS

Figure 1A:
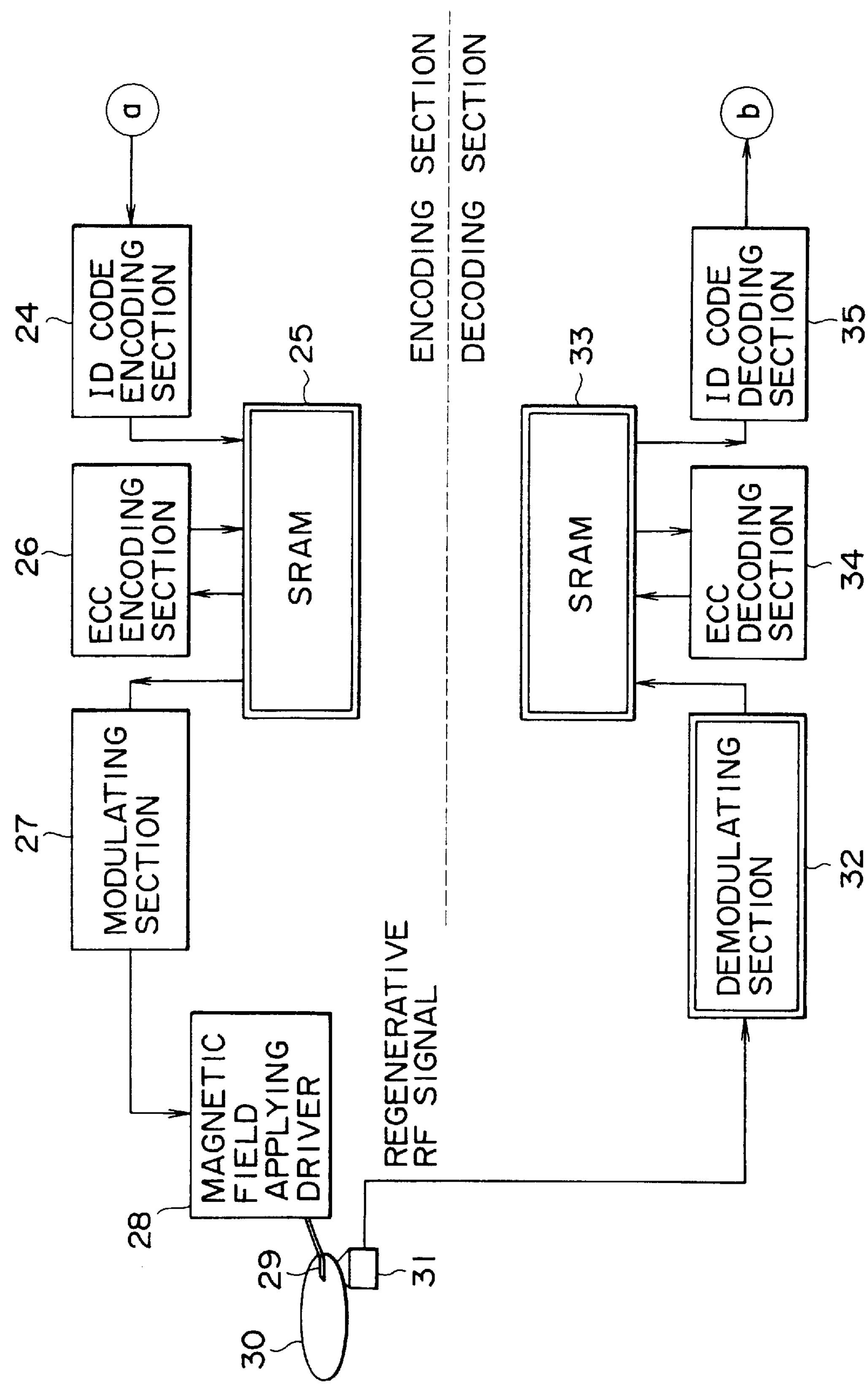

FIG. 1 is a block diagram showing an example of the constitution of an optical disk recording/regenerating apparatus to which the present invention is applied.

As shown in FIG. 1, dynamic random access memory (DRAM) 21 temporarily stores input data. An error detection code (EDC) encoding section 22 adds EDC for detecting an error to data supplied from DRAM 21 and outputs it. A scrambling section 23 scrambles data output from the EDC encoding section 22. An ID code encoding section 24 adds an ID code to the scrambled data.

The data output from the ID code encoding section 24 is stored in static random access memory (SRAM) 25 and at time at which data equivalent to one block is stored, an error correction code (ECC) for correcting an error is added by an ECC encoding section 26. After a modulating section 27 successively reads data stored in SRAM 25 and executes predetermined modulation, it supplies the data to a magnetic field applying driver 28.

The magnetic field applying driver 28 drives a coil for a magnetic field 29 according to the data supplied from the modulating section 27 and applies a magnetic field to an area to be recorded on an optical disk 30. An optical pickup 31 radiates a laser beam for recording or regeneration on the optical disk 30, photoelectrically transfers a laser beam for regeneration reflected from the optical disk 30 into an electric signal and outputs it as a regenerative RF signal.

A demodulating section 32 executes predetermined demodulating processing for a regenerative RF signal output from the optical pickup 31 and stores the acquired data in a predetermined area of SRAM 33. An ECC decoding section 34 executes error correction processing at time at which data supplied from the demodulating section 32 is stored in SRAM 33 by one block.

An ID code decoding section 35 reads data stored in SRAM 33 and extracts an ID code. An unscrambling section 36 unscrambles data output from the ID code decoding section 35. An EDC decoding section 37 extracts EDC from data output from the unscrambling section 36 and judges whether an error is included in regenerated data or not. DRAM 38 temporarily stores data output from the EDC decoding section 37 and outputs it.

Next, the operation of this embodiment will be described.

After input data is temporarily stored in DRAM 21, it is output to the EDC encoding section 22. The EDC encoding section 22 adds EDC for detecting an error to data output from DRAM 21 and supplies it to the scrambling section 23. The scrambling section 23 executes scrambling processing for data (processing for eliminating the regularity of data so that no fixed pattern is recorded and outputs it to the ID code encoding section 24.

After the ID code encoding section 24 inserts an ID code for detecting the address of the optical disk 30 into the head of each sector, it sequentially stores the ID code in SRAM 25. The ECC encoding section 26 adds ECC at time at which data equivalent to one block is stored in SRAM 25.

Data to which ECC is added by the ECC encoding section 26 is successively read from SRAM 25 and supplied to the modulating section 27. After the modulating section 27 adds a synchronizing pattern to data and executes predetermined modulation, it outputs the data to the magnetic field applying driver 28. The magnetic field applying driver 28 drives the coil for a magnetic field 29 according to data supplied from the modulating section 28 and applies a magnetic field to a predetermined area of the optical disk 30.

As a laser beam for recording is radiated from the optical pickup 31 at that time, the temperature of a recording medium in the area of the optical disk 30 in which a laser beam is radiated is raised and exceeds Curie point. The recording medium in an area the temperature of which exceeds Curie point is magnetized according to the direction of a magnetic field applied by the coil for a magnetic field 29 and data is recorded.

Next, a case in which data recorded on the optical disk 30 as described above is regenerated will be described.

The optical pickup 31 radiates a laser beam for regeneration lower in intensity than a laser beam for recording on a predetermined area of the optical disk 30 and generates a regenerative RF signal by photoelectrically transferring reflected light. After the regenerative RF signal is demodulated by the demodulating section 32, it is stored in SRAM 33 in units of block.

After an error correction is applied to data equivalent to one block stored in SRAM 33 by the ECC decoding section 34, the data is successively read by the ID code decoding section 35 and an ID code is extracted. The unscrambling section 36 unscrambles data output by the ID code decoding section 35, referring to the extracted ID code and outputs it to the EDC decoding section 37. The EDC decoding section 37 detects EDC from the unscrambled data and judges whether regenerated data includes an error or not. As a result, if the EDC decoding section judges that the regenerated data includes no error, it outputs the data to DRAM 38. If the EDC decoding section judges that the regenerated data includes an error, it controls the optical pickup 31 for example and again reads the same data from the optical disk 30.

After DRAM 38 once stores data output from the EDC decoding section 37, it outputs the data in synchronization with the data reading speed of an external device not shown.

Next, an example of the constitution of the demodulating section 32 will be described in detail.

Figure 2B:
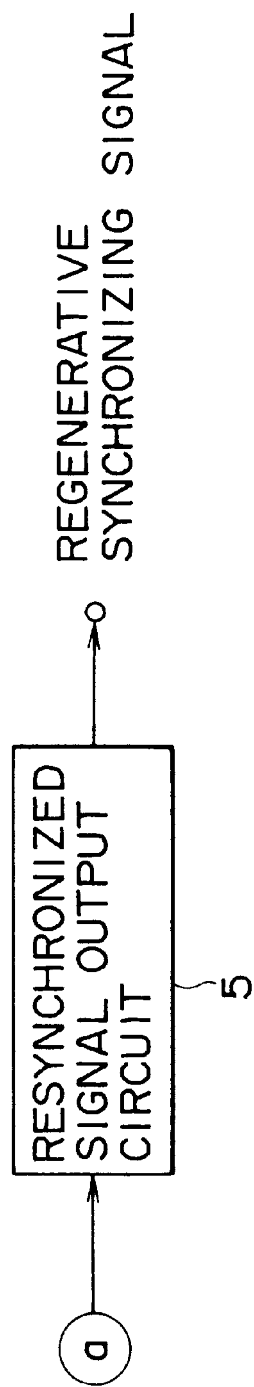
Figure 2:
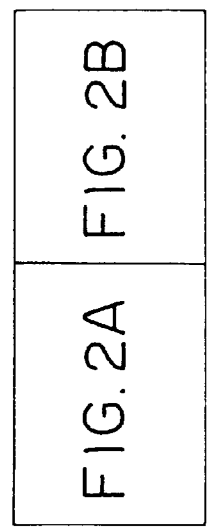

FIG. 2 is a block diagram showing an example of the constitution of a resynchronizer to which the present invention is applied. As the same reference number is allocated to a part in FIG. 2 corresponding to the part in FIG. 19, the description is omitted. In this embodiment, a synchronization judging circuit 50, a window signal generating circuit 51 and a reference counter 52 are newly added, compared with FIG. 19. The other constitution is the same as that in FIG. 19. The resynchronizer is built in the demodulating section 32 shown in FIG. 1.

The synchronization judging circuit 50 resets the reference counter 3 and the reference counter 52, referring to the output of the synchronizing signal detecting circuit 1, a window 2 signal output from the window signal generating circuit 4 and the output of the window signal generating circuit 51. The window signal generating circuit 51 is provided with the same constitution as the window signal generating circuit 4 and generates a window signal, referring to a signal output from the reference counter 52. The reference counter 52 is provided with the same constitution as the reference counter 3, counts values 0 to 1000 repeatedly and is reset by a reset 3 signal output from the synchronization judging circuit 50.

Figure 19A:
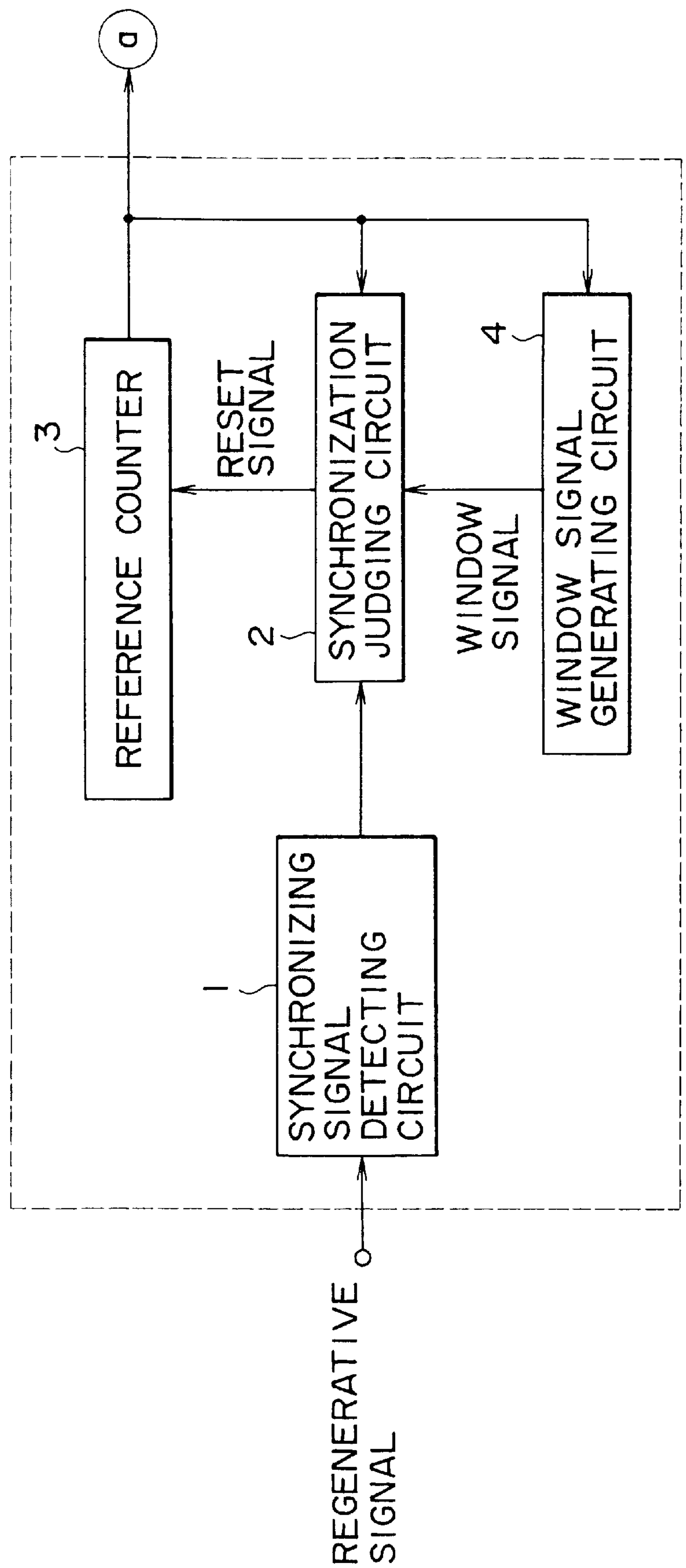
FIG. 19 and 19A–19B show an example of the constitution of a conventional type resynchronizer.
Figure 19B:
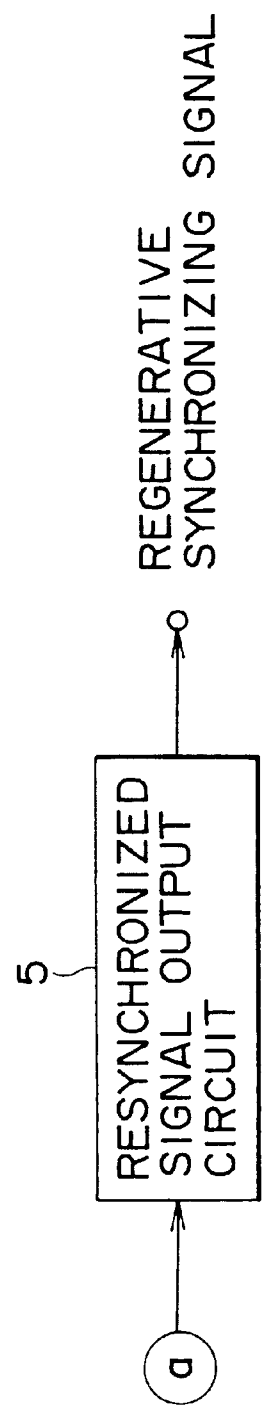
Figure 19:
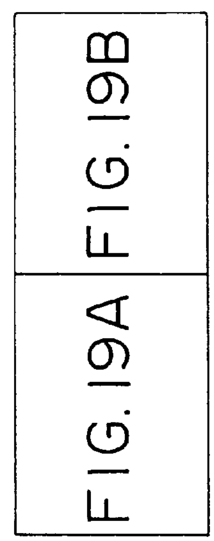
Figure 20B:
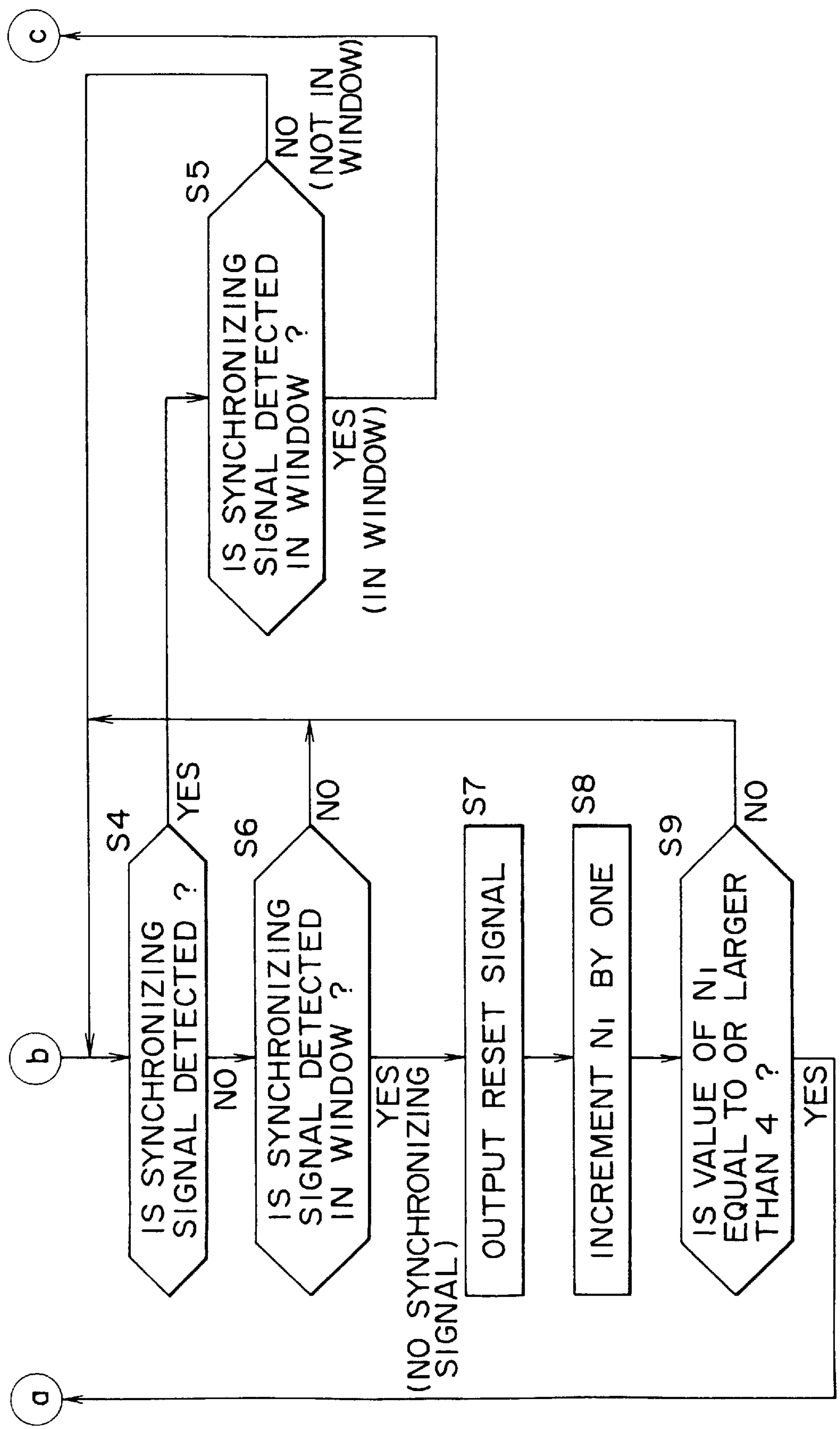
Figure 21:
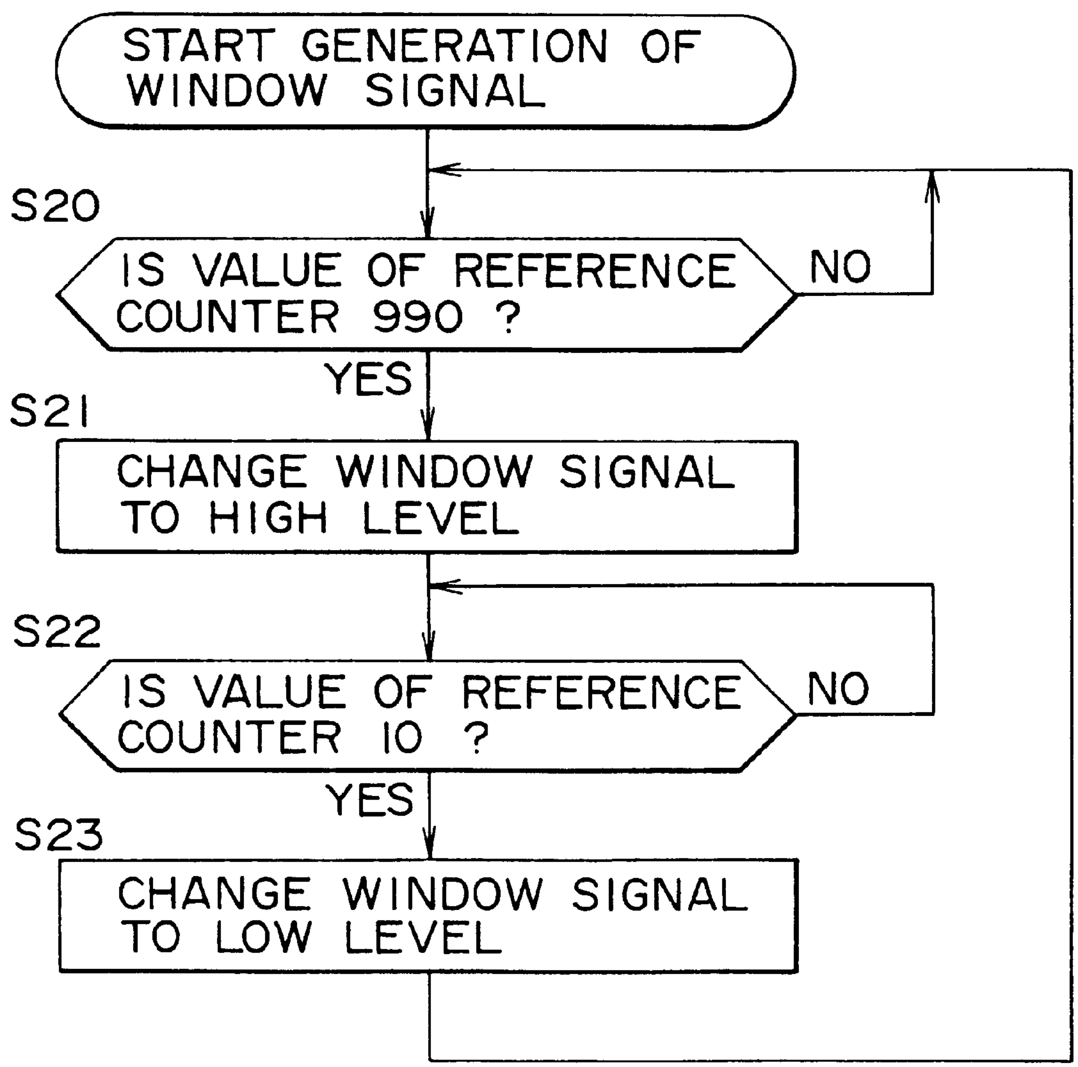
FIG. 21 is a flowchart for explaining an example of processing executed by a window signal generating circuit 4 shown in FIG. 19.

The other constitution is the same as in FIG. 19.

Next, referring to flowcharts shown in FIGS. 3 to 7, the operation of this embodiment will be described.

Figure 4A:
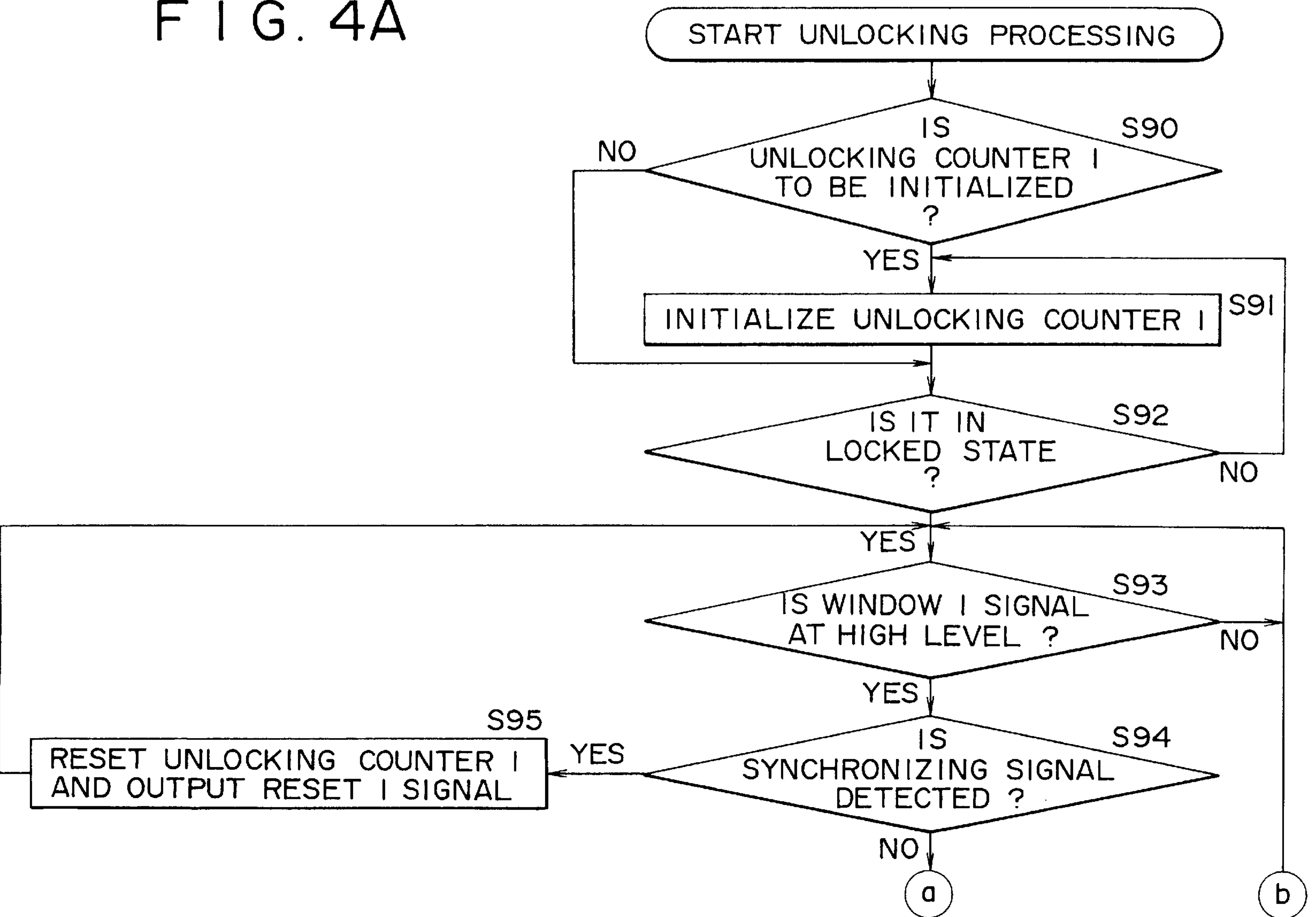
FIGS. 4 and 4A–4B are flowcharts for explaining an example of unlocking processing executed by the synchronization judging circuit 3 shown in FIG. 2.
Figure 4B:
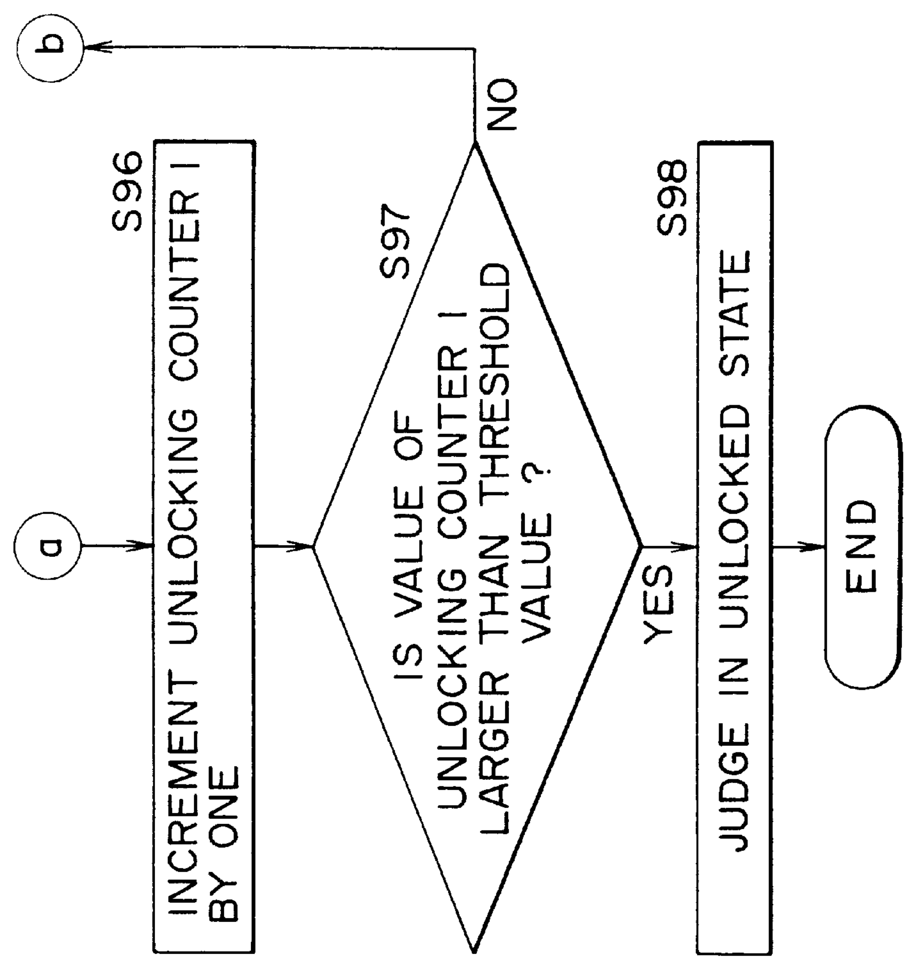
Figure 4:
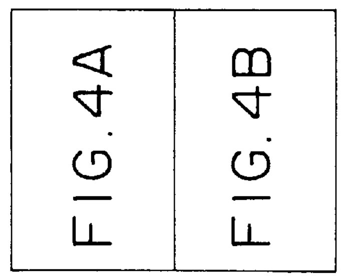

Processing shown in FIG. 3 shows an example of locking processing executed by the synchronization judging circuit 2 shown in FIG. 2. FIG. 4 shows an example of unlocking processing similarly executed by the synchronization judging circuit 2. A locked state means a state in which a synchronizing signal is protected and the reference counter 3 is reset only when a synchronizing signal is detected in case a window signal is at a high level. That is, any synchronizing signal detected while a window signal is at a low level is ignored.

Also, an unlocked state means a state in which a synchronizing signal is not protected, the reference counter 3 is reset and a resynchronizing signal is generated when a synchronizing signal is detected. That is, a resynchronizing signal is generated independent of a window signal.

When processing shown in FIG. 3 is executed, the synchronization judging circuit 2 judges whether a locking counter 1 is to be initialized or not in a step S60. That is, the synchronization judging circuit 2 judges whether a count value of the locking counter 1 is to be initialized or not. As a result, if it is judged that the count value is to be initialized (YES), processing proceeds to a step S62. If the count value is not to be initialized (NO), processing proceeds to a step S61.

In the step S61, it is judged whether the locking counter is unlocked or not and as a result, if it is judged that the locking counter is not unlocked (NO), the processing is finished (END) and if it is judged that the locking counter is unlocked (YES), processing proceeds to the step S62.

In the step S62, the locking counter 1 built in the synchronization judging circuit 2 and not shown is initialized to zero. In a step S63, it is judged whether a synchronizing signal is detected or not. As a result, if it is judged that a synchronizing signal is detected (YES), processing proceeds to a step S65 and if it is judged that a synchronizing signal is not detected (NO), processing proceeds to a step S64.

In the step S64, it is judged whether a window 1 signal is at a high level or not. As a result, if it is judged that a window 1 signal is at a high level (YES), processing proceeds to a step S67, after the value of the locking counter 1 is reset to zero, processing is returned to the step S63 and the same processing is repeated. If it is judged that a window 1 signal is at a low level (NO), processing is returned to the step S63 and the same processing is repeated.

If it is judged that a synchronizing signal is detected (YES) in the step S63, processing proceeds to the step S65, a reset 1 signal is output and the reference counter 3 is reset (the count value is set to zero). In a step S66, it is judged whether a window 1 signal is at a high level or not. As a result, if it is judged that a window 1 signal is at a low level (NO), processing proceeds to the step S67, after a count value of the locking counter 1 is reset to zero, processing is returned to the step S63 and the same processing is repeated. If it is judged that a window 1 signal is at a high level (YES), processing proceeds to a step S68.

In the step S68, the value of the locking counter 1 is incremented by one. Then, processing proceeds to a step S69 and in the step, it is judged whether the value of the locking counter 1 is larger than a predetermined threshold value or not. As a result, if it is judged that the value of the locking counter 1 is larger than the predetermined threshold value (YES), processing proceeds to a step S70, it is judged that the reference counter is locked and the processing is finished (END). In the step S69, if it is judged that the value of the locking counter 1 is smaller than the threshold value or that the value of the locking counter and the threshold value are equal (NO), processing is returned to the step S63 and the same processing is repeated.

Next, referring to FIG. 4, an example of unlocking processing will be described.

When this processing is executed, the synchronization judging circuit 2 judges whether an unlocking counter 1 is to be initialized or not in a step S90. As a result, if it is judged that the unlocking counter is to be initialized (YES), processing proceeds to a step S91 and a count value of the unlocking counter 1 built in the synchronization judging circuit 2 is set to zero. If it is judged that the unlocking counter is not to be initialized (NO), processing in the step S91 is skipped and processing proceeds to a step S92.

In the step S92, it is judged whether the reference counter is locked or not at present. As a result, if it is judged that the reference counter is not locked (NO), processing is returned to the step S91 and the same processing is repeated. If it is judged that the reference counter is locked (YES), processing proceeds to a step S93.

In the step S93, it is judged whether a window 1 signal is at a high level or not. As a result, if it is judged that a window 1 signal is at a low level (NO), processing is returned to the step S93 and the same processing is repeated. If it is judged that a window 1 signal is a high level (YES), processing proceeds to a step S94.

In the step S94, it is judged whether a synchronizing signal is detected or not. As a result, if it is judged that a synchronizing signal is detected (YES), processing proceeds to a step S95, a count value of the unlocking counter 1 is reset to zero, a reset 1 signal is output and a count value of the reference counter 3 is reset to zero. Then, processing is returned to the step S93 and the same processing is repeated. In the meantime, if it is judged in the step S94 that no synchronizing signal is detected (NO), processing proceeds to a step S96.

In the step S96, the value of the unlocking counter 1 is incremented by one and processing proceeds to a step S97. In the step S97, it is judged whether a count value of the unlocking counter 1 is larger than a predetermined threshold value or not. As a result, if it is judged that the value of the unlocking counter 1 is larger than the predetermined threshold value (YES), processing proceeds to a step S98, it is judged that the reference counter is not locked and the processing is finished (END). If it is judged that a count value of the unlocking counter 1 is smaller than the predetermined threshold value or that these are equal, processing is returned to the step S93 and the same processing is repeated.

Figure 5A:
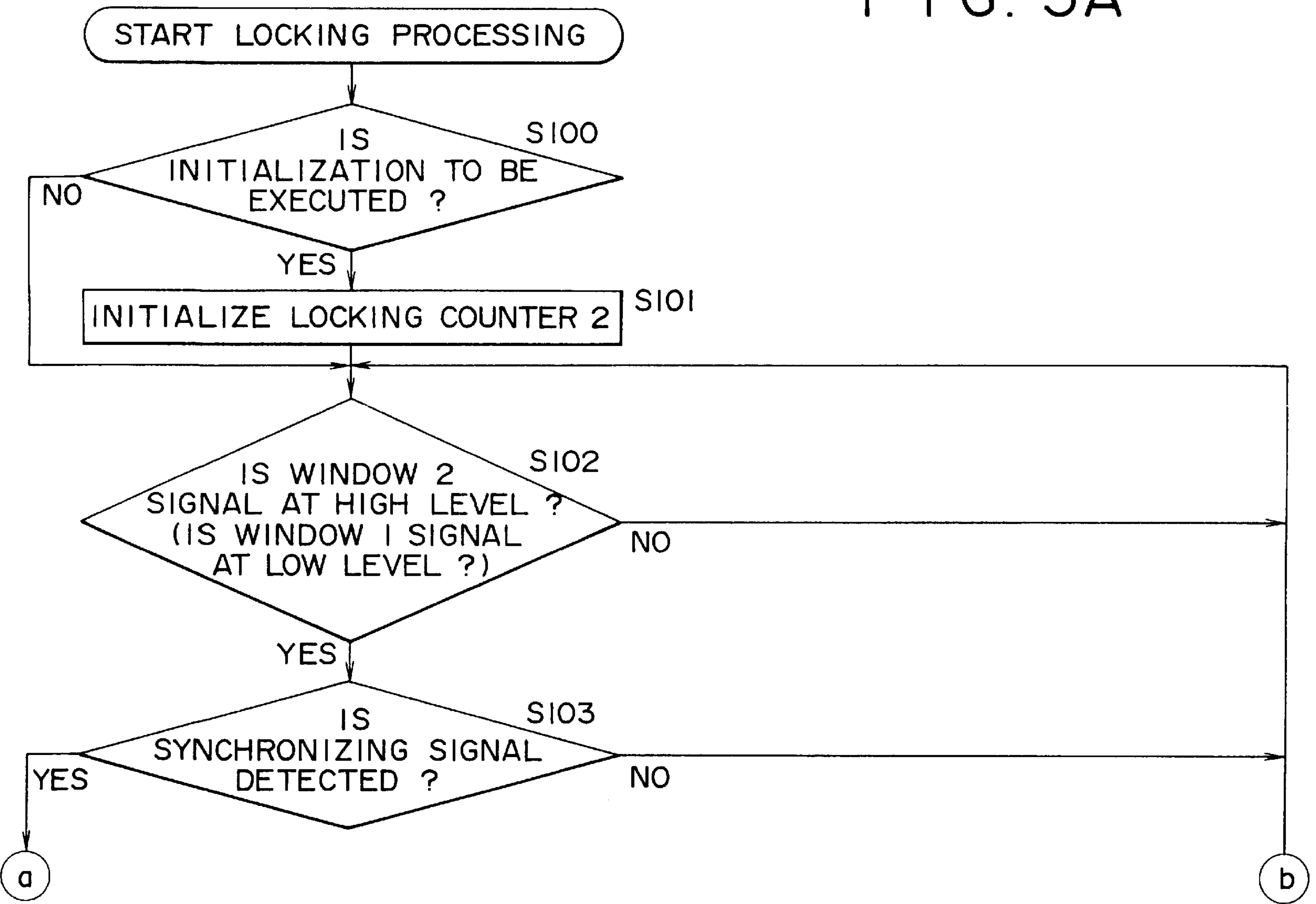
Figure 5B:
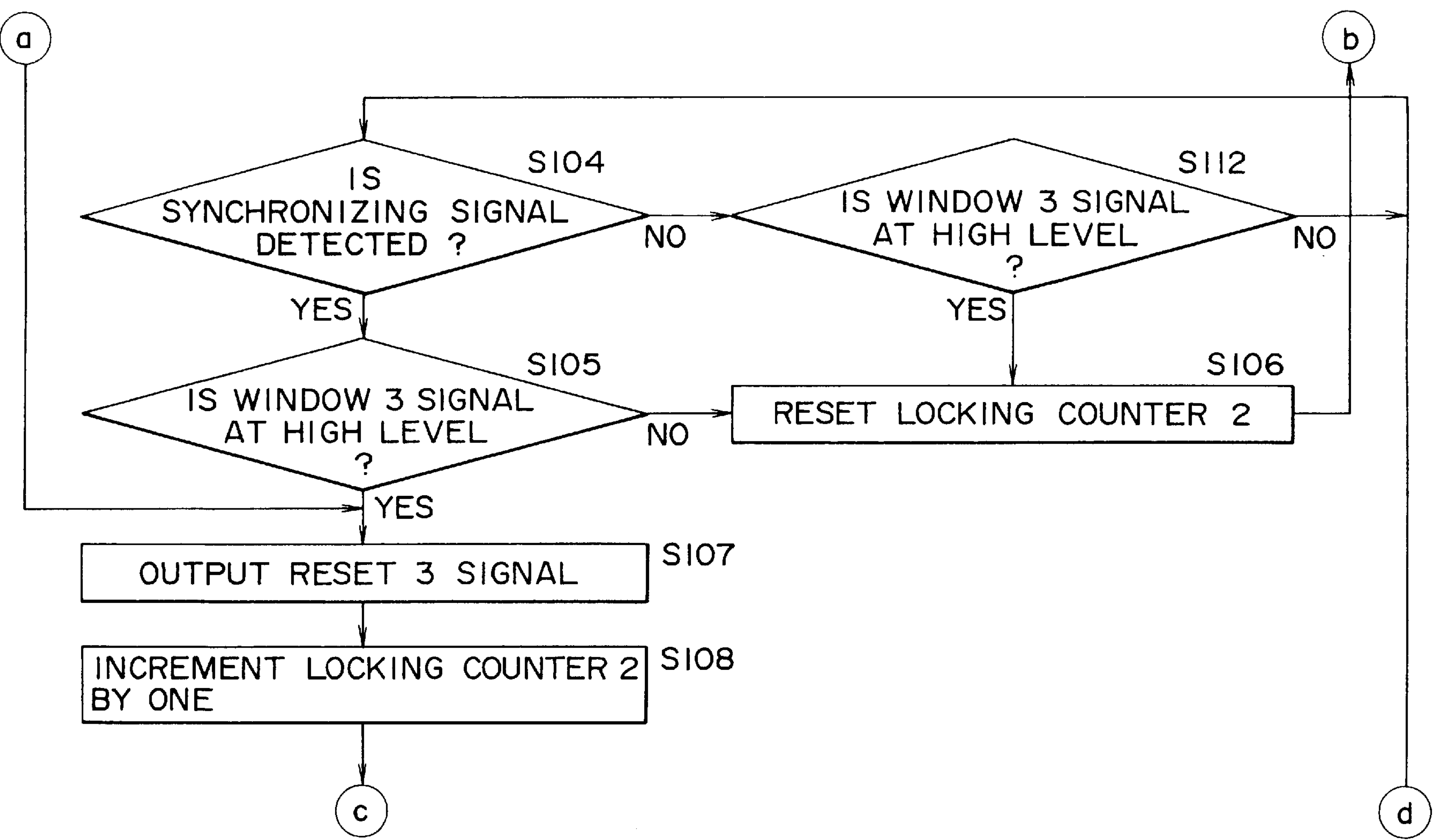

Next, referring to a flowchart shown in FIG. 5, locking processing executed by the synchronization judging circuit 50 will be described.

When this processing is executed, the synchronization judging circuit 50 judges in a step S100 whether initialization is to be executed or not. As a result, if it is judged that initialization is to be executed (YES), processing proceeds to a step S101 and the value of a locking counter 2 is initialized to zero. If it is judged that initialization is not to be executed (NO), processing in the step S101 is skipped and processing proceeds to a step S102.

In the step S102, it is judged whether a window 2 signal is at a high level or a window 1 signal is at a low level or not. As a result, if it is judged that a window 2 signal is at a high level or that a window 1 signal is at a low level (YES), processing proceeds to a step S103. If it is judged that a window 2 signal is at a low level or that a window 1 signal is at a high level (NO), processing is returned to the step S102 and the same processing is repeated.

In the step S103, it is judged whether a synchronizing signal is detected or not. As a result, if it is judged that a synchronizing signal is detected (YES), processing proceeds to a step S107. If it is judged that no synchronizing signal is detected (NO), processing is returned to the step S102 and the same processing is repeated.

In the step S107, a reset 3 signal is output and a count value of the reference counter 52 is reset. Then, processing proceeds to a step S108, the value of the locking counter 2 is incremented by one and processing proceeds to a step S109.

In the step S109, it is judged whether a count value of the locking counter 2 is larger than a predetermined threshold value or not. As a result, if it is judged that the count value of the locking counter 2 is larger than the predetermined threshold value (YES), processing proceeds to a step S110, a reset 2 signal is output, after a count value of the reference counter 3 is reset, it is judged in a step S111 that the reference counter is locked and the processing is finished (END). In the meantime, in the step S109, if it is judged that the count value of the locking counter 2 is smaller than the predetermined threshold value or that these are equal (NO), processing is returned to the step S104.

In the step S104, it is judged whether a synchronizing signal is detected or not. As a result, if it is judged that a synchronizing signal is detected (YES), processing proceeds to a step S105. If it is judged that no synchronizing signal is detected (NO), processing proceeds to a step S112.

In the step S112, it is judged whether a window 3 signal is at a high level or not. As a result, if it is judged that a window 3 signal is at a low level (NO), processing is returned to the step S104 and the same processing as described above is repeated. If it is judged that a window 3 signal is at a high level (YES), processing proceeds to a step S106, after the value of the locking counter 2 is reset to zero, processing is returned to the step S102 and the same processing as described above is repeated.

If it is judged in the step S104 that a synchronizing signal is detected (YES), processing proceeds to the step S105 and it is judged whether a window 3 signal is at a high level or not. As a result, if it is judged that a window 3 signal is at a low level (NO), processing proceeds to the step S106, after the value of the locking counter 2 is reset to zero, processing is returned to the step S102 and the same processing is repeated. If it is judged that a window 3 signal is at a high level (YES), processing proceeds to the step S107.

After the step S107, the same processing as described above is repeated.

Figure 6:
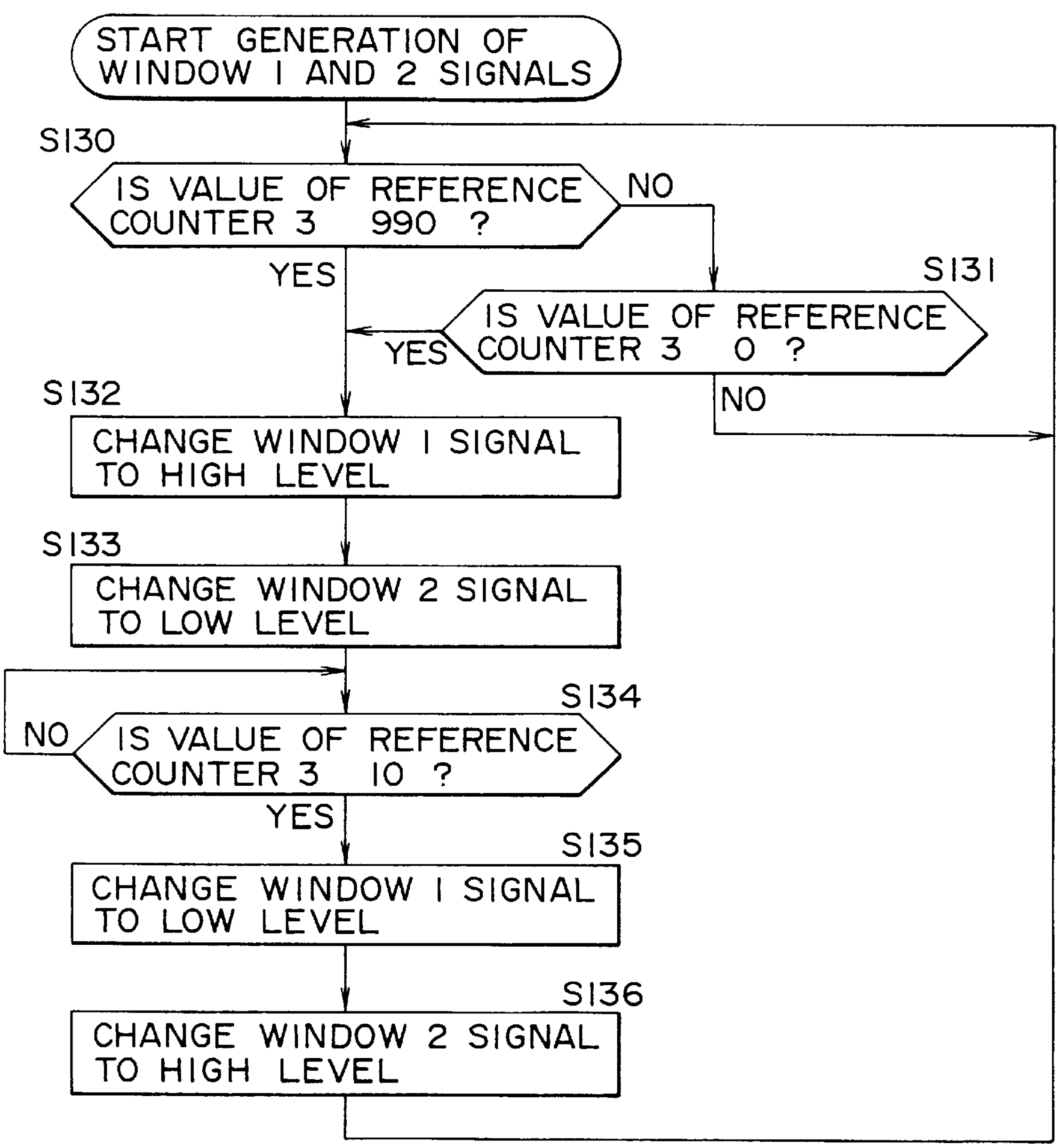
FIG. 6 is a flowchart for explaining an example of processing executed by a window signal generating circuit 4 shown in FIG. 2.

Next, referring to a flowchart shown in FIG. 6, the operation of the window signal generating circuit 4 for generating a window 1 signal and a window 2 signal will be described.

When this processing is executed, the window signal generating circuit 4 judges in a step S130 whether a count value of the reference counter 3 is 990 or not. As a result, if it is judged that the count value of the reference counter 3 is not 990 (NO), processing proceeds to a step S131. If it is judged that the count value is 990 (YES), processing proceeds to a step S132.

In the step S131, the window signal generating circuit 4 judges whether a count value of the reference counter 3 is zero or not. As a result, if it is judged that the count value of the reference counter 3 is not zero (NO), processing is returned to the step S130 and the same processing is repeated. If it is judged that the count value of the reference counter 3 is zero (YES), processing proceeds to a step S132.

In the step S132, the window signal generating circuit 4 changes a window 1 signal to a high level. Then, processing proceeds to a step S133.

In the next step S133, the window signal generating circuit 4 changes a window 2 signal to a low level. Then, processing proceeds to a step S134.

In the step S134, it is judged whether a count value of the reference counter 3 is 10 or not. As a result, if it is judged that the count value of the reference counter 3 is not 10 (NO), processing is returned to the step S134 and the same processing is repeated. If it is judged that the count value of the reference counter 3 is 10 (YES), processing proceeds to a step S135.

In the step S135, the window signal generating circuit 4 changes a window 1 signal to a low level. In the next step S136, the window signal generating circuit 4 changes a window 2 signal to a high level. Then, processing is returned to the step S130 and the same processing is repeated.

In case a count value of the reference counter 3 is between 990 and 1000 or between 0 to 10, a window 1 signal changed to a high level and a window 2 signal changed to a low level during the same period can be generated by the above processing.

Figure 7:
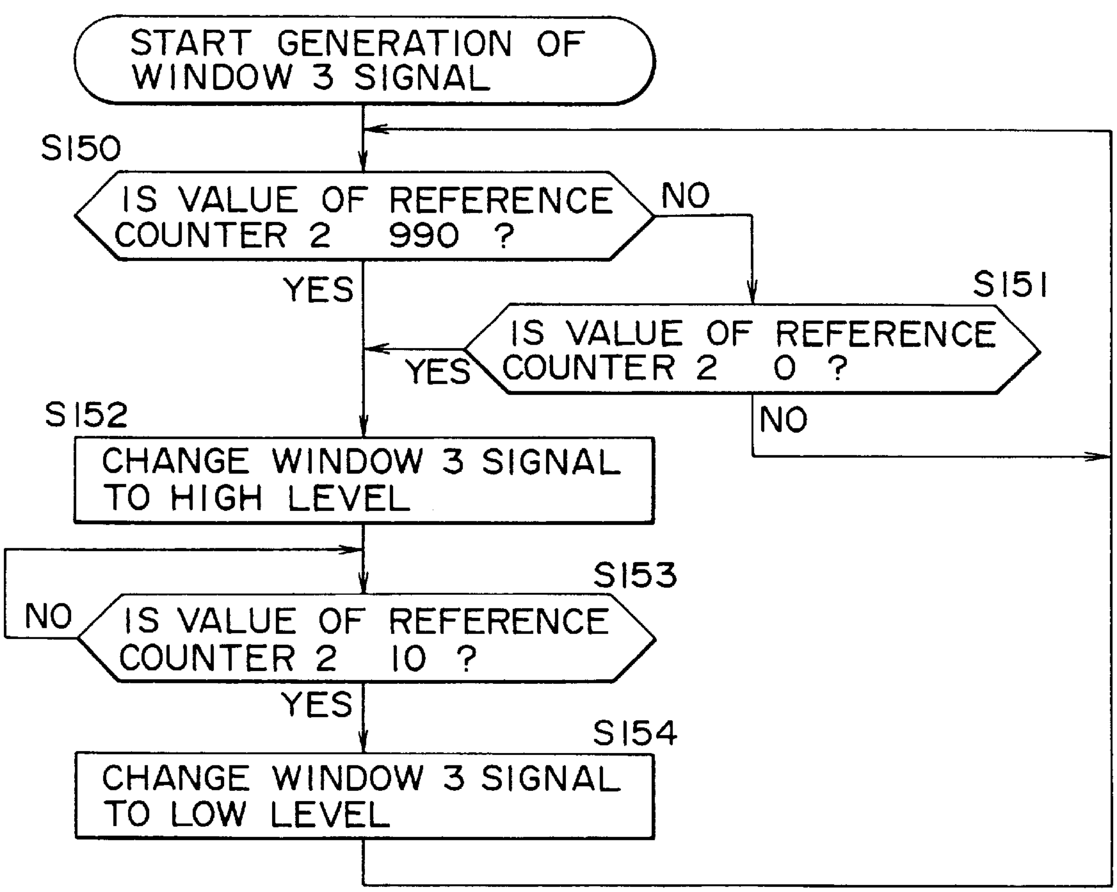
FIG. 7 is a flowchart for explaining an example of processing executed by a window signal generating circuit 51 shown in FIG. 2.

FIG. 7 is a flowchart for explaining the operation of the window signal generating circuit 51. When this processing is executed, the window signal generating circuit 51 judges in a step S150 whether a count value of the reference counter 52 is 990 or not. As a result, if it is judged that the value of the reference counter 52 is 990 (YES), processing proceeds to a step S152. If it is judged that a count value of the reference counter 52 is not 990 (NO), processing proceeds to a step S151.

In the step S151, it is judged whether a count value of the reference counter 52 is zero or not. As a result, if it is judged that the count value of the reference counter 52 is not zero (NO), processing is returned to the step S150 and the same processing is repeated. If it is judged that the count value of the reference counter 52 is zero (YES), processing proceeds to the step S152.

In the step S152, the window signal generating circuit 51 changes a window 3 signal to a high level. Then, processing proceeds to a step S153.

In the step S153, it is judged whether a count value of the reference counter 52 is 10 or not. As a result, if it is judged that the count value of the reference counter 52 is not 10 (NO), processing is returned to the step S153 and the same processing is repeated. If it is judged that the count value of the reference counter 52 is 10 (YES), processing proceeds to a step S154.

In the step S154, the window signal generating circuit 51 changes a window 3 signal to a low level. Then, processing is returned to the step S150 and the same processing is repeated.

In case a count value of the reference counter 52 is between 990 and 1000 or between 0 and 10, a window 3 signal changed to a high level can be generated by the above processing.

Figure 22:
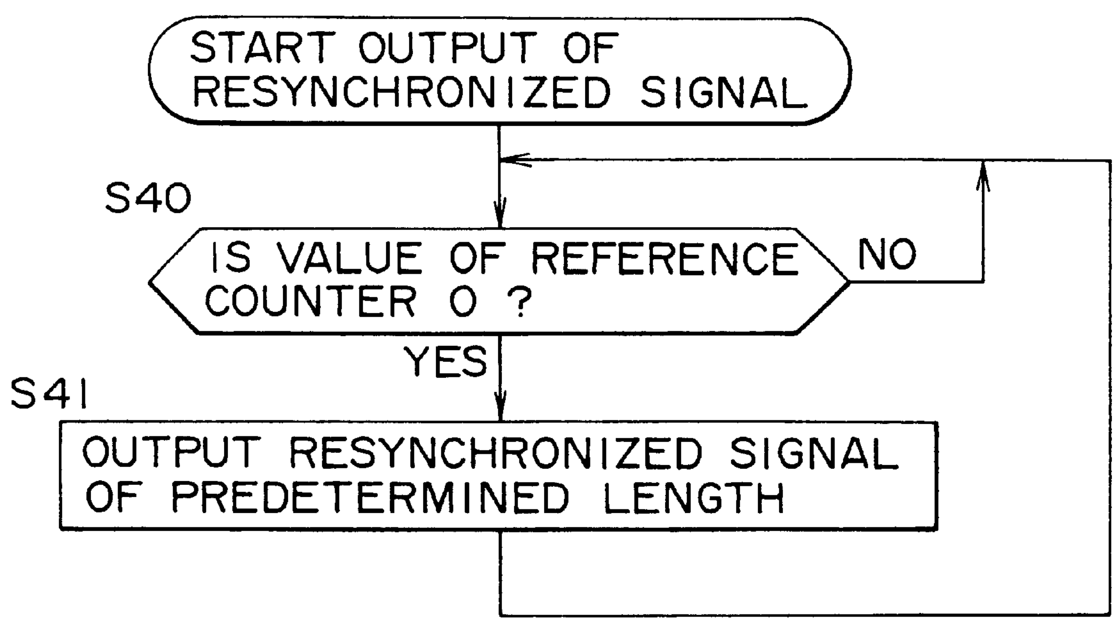
FIG. 22 is a flowchart for explaining an example of processing executed by a resynchronizing signal output circuit 5 shown in FIG. 19.

However, processing executed in the resynchronizing signal output circuit 5 is the same as that shown in FIG. 22.

Next, referring to a timing chart shown in FIG. 8, the above processing will be described in the concrete.

Suppose that the regeneration of the optical disk 30 shown in FIG. 1 is started and the supply of a regenerative RF signal to the demodulating section 32 is started. The synchronization judging circuit 2 shown in FIG. 2 built in the demodulating section 32 judges whether a detected synchronizing signal is locked or not by the processing shown in FIG. 3 or FIG. 4, referring to a detected synchronizing signal shown in FIG. 8A output from the synchronizing signal detecting circuit 1. If it is judged that a detected synchronizing signal is locked, the first pulse of the detected synchronizing signal shown in FIG. 8A and the first pulse of a window 1 signal shown in FIG. 8B are synchronous as shown in FIG. 8.

Next, if the second detected synchronizing signal is not detected due to anything, the reference counter 3 is reset to zero in case the count value exceeds the maximum value (1000) because the reference counter is a circulating counter as described above. When the count value is reset to zero, processing shown in FIG. 22 is executed and a resynchronizing signal shown in FIG. 8E is output from the resynchronizing signal output circuit 5.

Suppose that then, the third detected synchronizing signal shown in FIG. 8A is input at timing earlier than usual due to the jump of a track for example. In that case, the synchronization judging circuit 50 judges in the step S102 shown in FIG. 5 that a window 2 signal is at a high level (YES), further judges in the step S103 that a synchronizing signal is detected (YES) in the step S103 and advances processing to the step S107.

As a reset 3 signal is output in the step S107, the third pulse of the window 3 signal shown in FIG. 8D is output.

In the step S108, the value of the locking counter 2 is incremented by one and processing proceeds to the step S109. In the step S109, it is judged whether the value of the locking counter 2 is larger than a predetermined threshold value (a value '1' in an example shown in FIG. 8) or not. As the value of the locking counter 2 is 1, it is judged that the value of the locking counter 2 is not larger (NO) in the step S109 and processing is returned to the step S104.

Next, when the fourth pulse of the detected synchronizing signal is input, it is judged in the step S104 that a synchronizing signal is detected (YES) and processing proceeds to the step S105. In the step S105, as a window 3 signal is at a high level (the window 3 signal and the fourth pulse of the detected synchronizing signal are synchronous), it is judged that a window 3 signal is at a high level (YES) and processing proceeds to the step S107. Then, a reset 3 signal is output and the reference counter 52 is reset.

In the step S108, the locking counter 2 is incremented by one. As a result, as the value of the locking counter 2 is 2, it is judged in the step S109 that it is larger than a predetermined threshold value (YES)(because the predetermined threshold value is 1 as described above) and processing proceeds to the step S110.

In the step S110, a reset 2 signal is output and the reference counter 3 is reset. As a result, timing at which the respective pulses of a window 1 signal and a window 2 signal are output is synchronous with timing after the jump of a track at which a synchronizing signal is detected.

Next, in case the seventh pulse of the detected synchronizing signal is input, it is judged in the step S102 that the seventh pulse is in the period of a window 2 signal (YES) and it is further judged in the next step S103 that a synchronizing signal is detected (YES). Therefore, processing proceeds to the step S107 and after a reset 3 signal is output and the reference counter 52 is reset, processing proceeds to the step S104. However, as the eighth pulse of the detected synchronizing signal is input immediately after it, it is judged in the step S105 that a window 3 signal is not at a high level and as processing is returned to the step S102, the reference counter 3 is not reset (the processing in the step S110 is not executed). Therefore, the timing of a window 1 signal and a window 2 signal is not changed.

As shown in FIG. 8F, as error duration in which a regenerative synchronizing signal is not normal is reduced by the above processing, compared with that shown in FIG. 23D, a situation in which a signal read from the optical disk 30 cannot be regenerated for a long term can be avoided in case the jump of a track and others occur for example.

A threshold value in the above embodiment can be suitably changed according to a device to which the present invention is applied. For example, if the threshold value in the step S109 shown in FIG. 5 is changed, timing at which a reset 2 signal is output can be suitably changed. For example, as the number of pulses of a synchronizing signal required until the timing of synchronization is changed is increased if the threshold value is increased, a malfunction and others caused for example in case an erroneously detected signal and others are input can be prevented as a result.

Figure 9A:
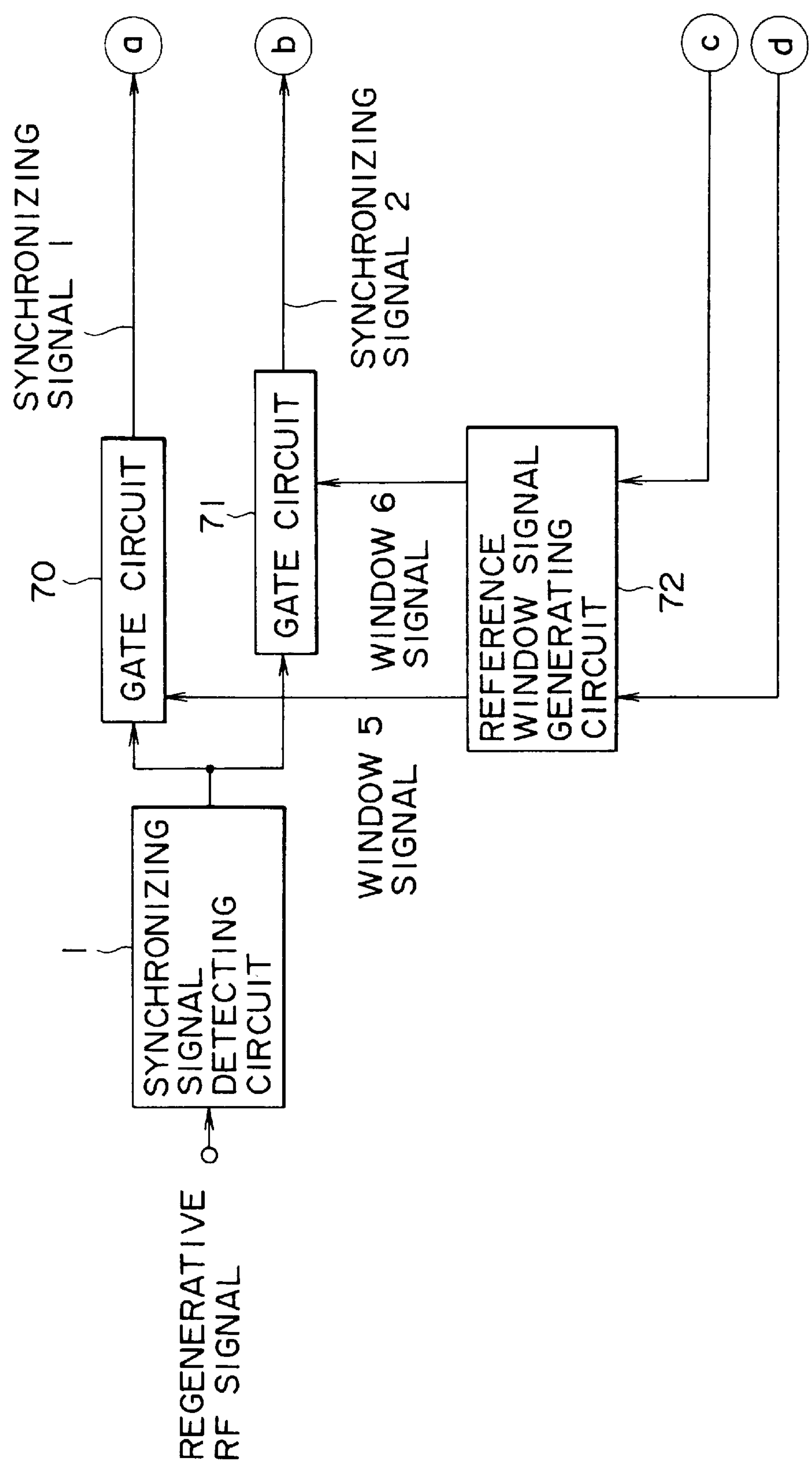
Figures 9, 9C:
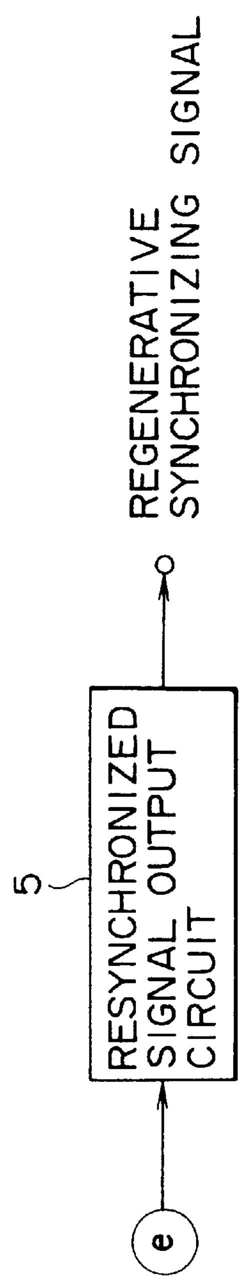

FIG. 9 is a flowchart showing an example of another embodiment of the regenerator according to the present invention. As in FIG. 9, the same reference number is allocated to a part corresponding to that in FIG. 2, the description of the part is omitted.

In this embodiment, gate circuits 70 and 71, a reference window signal generating circuit 72, synchronization judging circuits 73 and 74, a counter 75 and a switch 76 are added.

The gate circuits 70 and 71 AND a detected synchronizing signal output from the synchronizing signal detecting circuit 1 and a signal output from the reference window signal generating circuit 72 and output the result.

The reference window signal generating circuit 72 generates a window signal for extracting a detected synchronizing signal at predetermined timing, referring to each output of the counter output control circuit 75 and the switch 76 and supplies it to the gate circuits 70 and 71.

The synchronization judging circuit 73 outputs a locking 1 signal to the counter output control circuit 75 in case the output of the gate circuit 70 and the window signal generating circuit 4 is synchronous sequentially twice or more. The synchronization judging circuit 73 also resets the reference counter 3 according to a reset signal 3.

The synchronization judging circuit 74 also similarly outputs a locking 2 signal to the counter output control circuit 75 in case the output of the gate circuit 71 and the window signal generating circuit 51 is synchronous sequentially twice or more and also resets the reference counter 52 according to a reset signal 4.

Next, referring to a timing chart shown in FIG. 10, the operation of this embodiment will be described.

When a reset signal is input, the counter output control circuit 75 switches the connection of the switch 76 to the side of the reference counter 3. As a result, a count value of the reference counter 3 is output to the resynchronizing signal output circuit 5. Also, the output of the counter output control circuit 75 and the output of the switch 76 are supplied to the reference window signal generating circuit 72. The reference window signal generating circuit 72 generates a window 5 signal and a window 6 signal based upon these signals and respectively supplies them to the gate circuits 70 and 71.

A detected synchronizing signal output from the synchronizing signal detecting circuit 1 is supplied to the gate circuits 70 and 71. A window 5 signal corresponds to a window 1 signal in FIG. 2 and a window 6 signal corresponds to a window 2 signal. That is, a signal generated by inverting a window 5 signal is a window 6 signal.

As a window 5 signal is at a high level at this time in case the first pulse of a detected synchronizing signal shown in FIG. 10A is input, the pulse of a synchronizing signal 1 shown in FIG. 10D is output from the gate circuit 70 and output to the synchronization judging circuit 73.

The synchronization judging circuit 73 outputs a locking 1 signal to the counter output control circuit 75 in case the timing of the output from the gate circuit 70 and a window 3 signal from the window signal generating circuit 4 is equal sequentially more than a predetermined frequency (twice in this embodiment). That is, if the timing is equal sequentially twice, a locking 1 signal is output and if it is also equal sequentially at/after the third time, a locking 1 signal is output every time. The counter output control circuit 75 receives the locking 1 signal output from the synchronization judging circuit 73 and switches the connection of the switch 76 to the side of the reference counter 3. As a result, the first pulse of a resynchronizing signal shown in FIG. 10E is output from the resynchronizing signal output circuit 5 at timing at which a count value of the reference counter 3 is zero.

Next, as a detected synchronizing signal shown in FIG. 10A is not output from the synchronizing signal detecting circuit 1 though a window 5 signal and a window 6 signal are output from the reference window signal generating circuit 72 if the second pulse of the detected synchronizing signal shown in FIG. 10A is not detected due to anything, no pulse is output from the gate circuits 70 and 71. However, as the reference counter 3 is a circulating counter, the second regenerative synchronizing signal shown in FIG. 10F is output from the resynchronizing signal output signal 5 at timing at which a count value of the reference counter 3 is zero. At this time, the switch 76 is connected to the reference counter 3 because the switch is kept as it is after the connection is changed when the first detected synchronizing signal is input.

Next, suppose that the third pulse of the detected synchronizing signal shown in FIG. 10A is input at timing earlier than usual due to the jump of a track and others. As a window 5 signal is at a low level at this time, the gate circuit 70 outputs nothing. In the meantime, as a window 6 signal is at a high level, a synchronizing signal 2 shown in FIG. 10E is output from the gate circuit 71 and supplied to the synchronization judging circuit 74.

The synchronization judging circuit 74 detects that the first synchronizing signal 2 shown in FIG. 10E is input, outputs a reset 4 signal and resets a count value of the reference counter 52 to zero. As described above, as the synchronization judging circuit 74 is constituted so that it outputs a locking 2 signal in case a synchronizing signal 2 is input sequentially twice, no locking 2 signal is output in this case. Therefore, a regenerative synchronizing signal shown in FIG. 10F is not output in response to the input of the third pulse of the detected synchronizing signal.

As no detected synchronizing signal is input when a window 5 signal output from the reference window signal generating circuit 72 is changed to a high level after the third pulse of the detected synchronizing signal is input, a synchronizing signal 1 is not output. However, as the switch 76 is connected to the reference counter 3, the third regenerative synchronizing signal shown in FIG. 10F is output from the resynchronizing signal output circuit 5 at timing at which a count value of the reference counter 3 is zero.

Next, suppose that the fourth pulse of the detected synchronizing signal shown in FIG. 10A is input. In that case, as a window 6 signal shown in FIG. 10C is at a high level, a synchronizing signal is output from the gate circuit 71 and supplied to the synchronization judging circuit 74. The synchronization judging circuit 74 receives the second synchronizing signal and outputs a locking 2 signal to the counter output control circuit 75. The counter output control circuit 75 receives the locking 2 signal and switches the connection of the switch 76 to the side of the reference counter 52.

As a result, as the output of the reference counter 52 is supplied to the resynchronizing signal output circuit 5 via the switch 76, the fourth regenerative synchronizing signal shown in FIG. 10F is output in synchronization with the fourth detected synchronizing signal from the resynchronizing signal output circuit 5.

Next, as a window 6 signal is at a high level when the fifth pulse of the detected synchronizing signal is input, the third synchronizing signal 2 shown in FIG. 10E is output to the synchronization judging circuit 74. As result, the synchronization judging circuit 74 outputs a locking 2 signal to the counter output control circuit 75.

The counter output control circuit 75 receives the second locking 2 signal and switches the connection of the switch 76 to the side of the reference counter 52. As a result, the resynchronizing signal output circuit 5 outputs the fifth regenerative synchronizing signal shown in FIG. 10F.

At this time, the reference window signal generating circuit 72 receives each output of the counter output control circuit 75 and the switch 76, respectively inverts a window 5 signal and a window 6 signal respectively shown in FIGS. 10B and C and synchronizes the timing of these window signals with the fifth pulse of the detected synchronizing signal. That is, if a locking 2 signal is output sequentially twice, the reference window signal generating circuit 72 inverts a window 5 signal and a window 6 signal and again synchronizes timing at which these window signals are generated with a synchronizing signal.

Then, when a window 5 signal is at a low level and a window 6 signal is at a high level, the sixth pulse of the detected synchronizing signal shown in FIG. 10A is input. Therefore, a synchronizing signal 2 is output from the gate circuit 71, as a result, the same processing as described above is executed and the sixth regenerative synchronizing signal is output from the resynchronizing signal output circuit 5.

The same processing as the case of the third pulse is executed in response to the input of the seventh erroneously detected pulse of the detected synchronizing signal. Therefore, no regenerative synchronizing signal is output in response to the pulse. Further, as processing for the ninth detected synchronizing signal not detected due to anything is also the same as processing for the second pulse, the description is omitted.

According to the above embodiment, as the error duration shown in FIG. 10G can be reduced as in the embodiment shown in FIG. 2, data read from the optical disk 30 can be precisely regenerated.

Also, according to the above embodiment, even if an erroneously detected pulse signal provided with the same cycle as a normal detected synchronizing signal is input sequentially twice, a malfunction can be prevented. Referring to FIGS. 11 and 12, operation in such a case will be described.

FIG. 11 is a timing chart showing the operation in case an erroneously detected pulse (the third and fifth detected synchronizing signals) provided with the same cycle t2 (=t1) as a normal cycle t1 is input in the embodiment shown in FIG. 2.

As shown in FIG. 11, when the third erroneously detected pulse of a detected synchronizing signal is input in the embodiment shown in FIG. 2, the reference counter 52 is reset by a reset 3 signal. When the erroneously detected pulse of the fifth detected synchronizing signal is input, the reference counter 3 counts in synchronization with the third and fifth detected synchronizing signals (erroneously detected pulses) because the synchronization judging circuit 50 resets the reference counter 3. As a result, as the synchronization judging circuit 2 judges the sixth pulse (a normal pulse) of the detected synchronizing signal to be an erroneously detected pulse, a regenerative synchronizing signal shown in FIG. 11E for this pulse is not output.

Next, as the synchronization judging circuit 50 resets the reference counter 3 by a reset 2 signal when the seventh pulse of the detected synchronizing signal is input, the count operation of the reference counter 3 is synchronized with the sixth and seventh pulses of the detected synchronizing signal.

That is, as shown in FIG. 11, if an erroneously detected signal (the third and fifth pulses) provided with the same cycle as a normal detected synchronizing signal is input, duration between the fifth and seventh pulses of the detected synchronizing signal is error duration as shown in FIG. 11F.

In the meantime, operation shown in FIG. 12 is executed in the embodiment shown in FIG. 9.

That is, as a window 6 signal shown in FIG. 12C is at a high level when the third pulse (an erroneously detected pulse) of the detected synchronizing signal is input, the gate circuit 71 outputs a synchronizing signal 2 and supplies it to the synchronization judging circuit 74. The synchronization judging circuit 74 outputs a reset 4 signal and resets the reference counter 52. In this case, as no locking 2 signal is output from the synchronization judging circuit 74, the switch 76 is kept connected to the reference counter 3 and the resynchronizing signal output circuits outputs nothing.

Next, as a window 5 signal shown in FIG. 12B is at a high level when the fourth pulse (a normal pulse) of the detected synchronizing signal is input, the gate circuit 70 outputs a synchronizing signal 1. As the synchronizing signal 1 is input sequentially twice or more (the first, second and fourth pulses are input), the synchronization judging circuit 73 outputs a locking 1 signal. When the counter output control circuit 75 receives the locking 1 signal, the resynchronizing signal output circuit 5 outputs the third resynchronizing signal in synchronization with output from the reference counter 3 because the counter output control circuit 75 keeps the switch 76 connected to the reference counter 3.

Next, as a window 6 signal shown in FIG. 12C is at a high level when the fifth erroneously detected pulse of the detected synchronizing signal is input, a synchronizing signal 2 shown in FIG. 12E is output from the gate circuit 71. The synchronization judging circuit 74 outputs a locking 2 signal when the synchronizing signal 2 is input sequentially twice. The counter output control circuit 75 receives the locking 2 signal and changes the connection of the switch 76 to the side of the reference counter 52. As a result, the resynchronizing signal output circuit 5 receives output from the reference counter 52 and outputs the fourth pulse of the regenerative synchronizing signal.

Next, as a window 5 signal shown in FIG. 12B is at a high level when the sixth pulse of the detected synchronizing signal is input, a synchronizing signal 1 is output from the gate circuit 70 and supplied to the synchronization judging circuit 73. As a result, as the synchronization judging circuit 73 outputs a locking 1 signal (as normal pulses (the first, second, fourth and sixth pulses) are sequentially input, it is considered that a synchronizing signal 1 is sequentially input twice or more and the locking 1 signal is output), the counter output control circuit 75 switches the connection of the switch 76 to the side of the reference counter 3. Therefore, the resynchronizing signal output circuit 5 receives the output of the reference counter 3 and outputs the fifth regenerative synchronizing signal.

As no erroneously detected pulse is input (no pulse signal of the same timing as the third and fourth pulses is input) between the sixth and seventh pulses of the detected synchronizing signal shown in FIG. 12A, the polarity of a window 5 signal and a window 6 signal respectively output from the reference window signal generating circuit 72 is kept as it is (the output signal is not inverted). Therefore, a regenerative synchronizing signal is output from the resynchronizing signal output circuit 5 in synchronization with a count value of the reference counter 3 in response to the input of the seventh and later pulses of the detected synchronizing signal.

As described above, in the embodiment shown in FIG. 9, as it can be prevented to be synchronized with an erroneously detected pulse even if the erroneously detected pulse provided with the same cycle as a normal detected synchronizing signal is sequentially input twice or more, error duration can be further reduced as shown in FIG. 12.

In the above embodiment, the present invention is applied to the resynchronizer, however, the present invention may be also applied to a regenerative address generator for generating a regenerative address for example.

Figure 13:
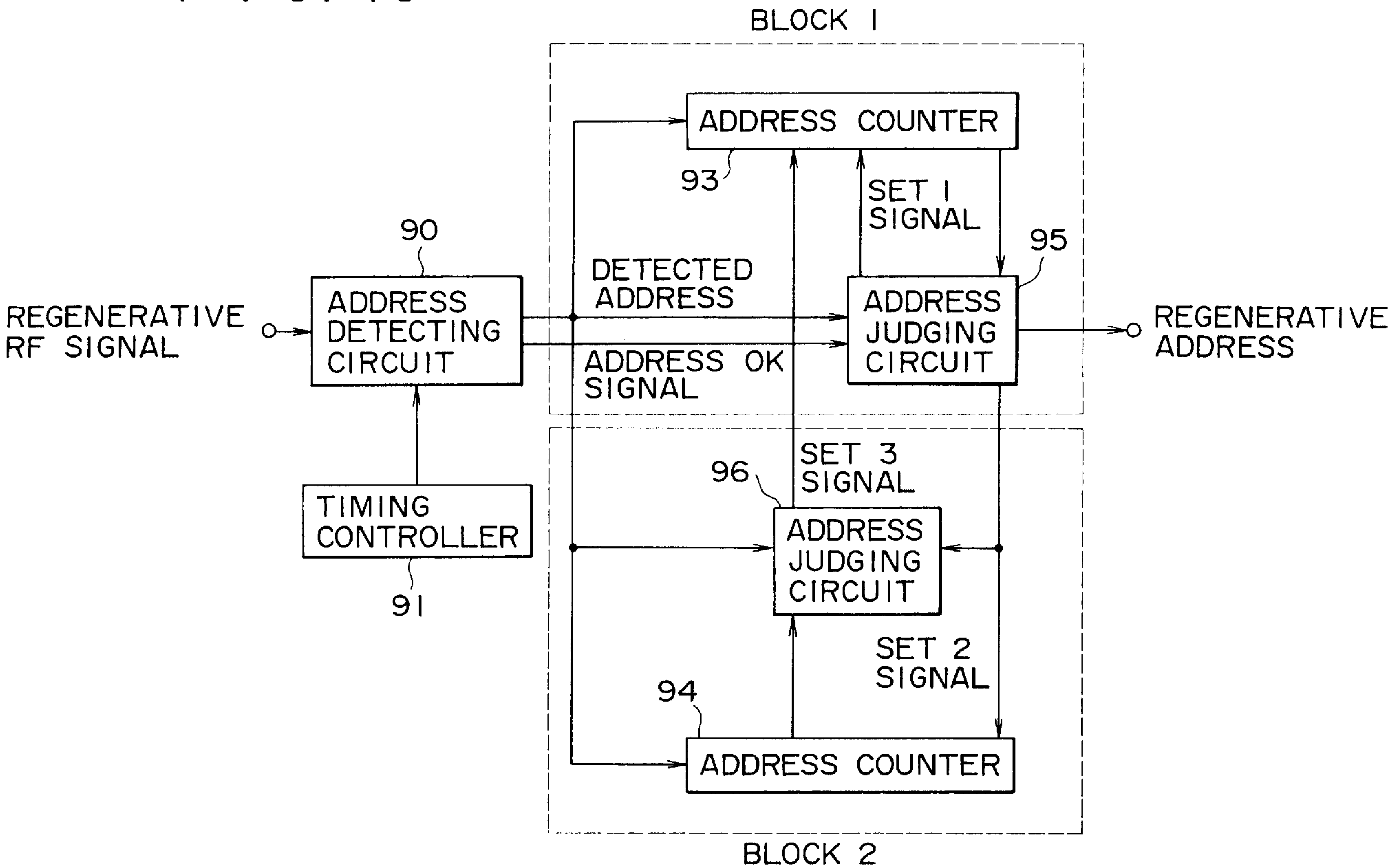
FIG. 13 is a block diagram showing further another embodiment of the regenerator according to the present invention.

FIG. 13 is a block diagram showing an example of the constitution of a regenerative address generator to which the present invention is applied. This embodiment is built in the demodulating section 32 shown in FIG. 1.

As shown in FIG. 13, an address detecting circuit 90 (detection means) detects and outputs an address included in a demodulated signal. A timing controller 91 generates a timing signal for detecting an address signal based upon the above synchronizing signal and supplies it to the address detecting circuit 90.

An address counter 93 (first count means) counts an address value in the same cycle as a cycle in which an address is detected. An address judging circuit 95 (inserted signal generating means) outputs a regenerative address according to the result of comparison between a count value of the address counter 93 and a detected address output from the address detecting circuit 90.

Also, an address judging circuit 96 outputs a setting 3 signal according to the result of comparison between a count value of an address counter 94 (second count means) and a detected address from the address detecting circuit 90 and changes a count value of the address counter 93.

Next, referring to a flowchart shown in FIG. 14, the operation of the above embodiment will be described.

Figures 14, 14A, 14B, 14C:
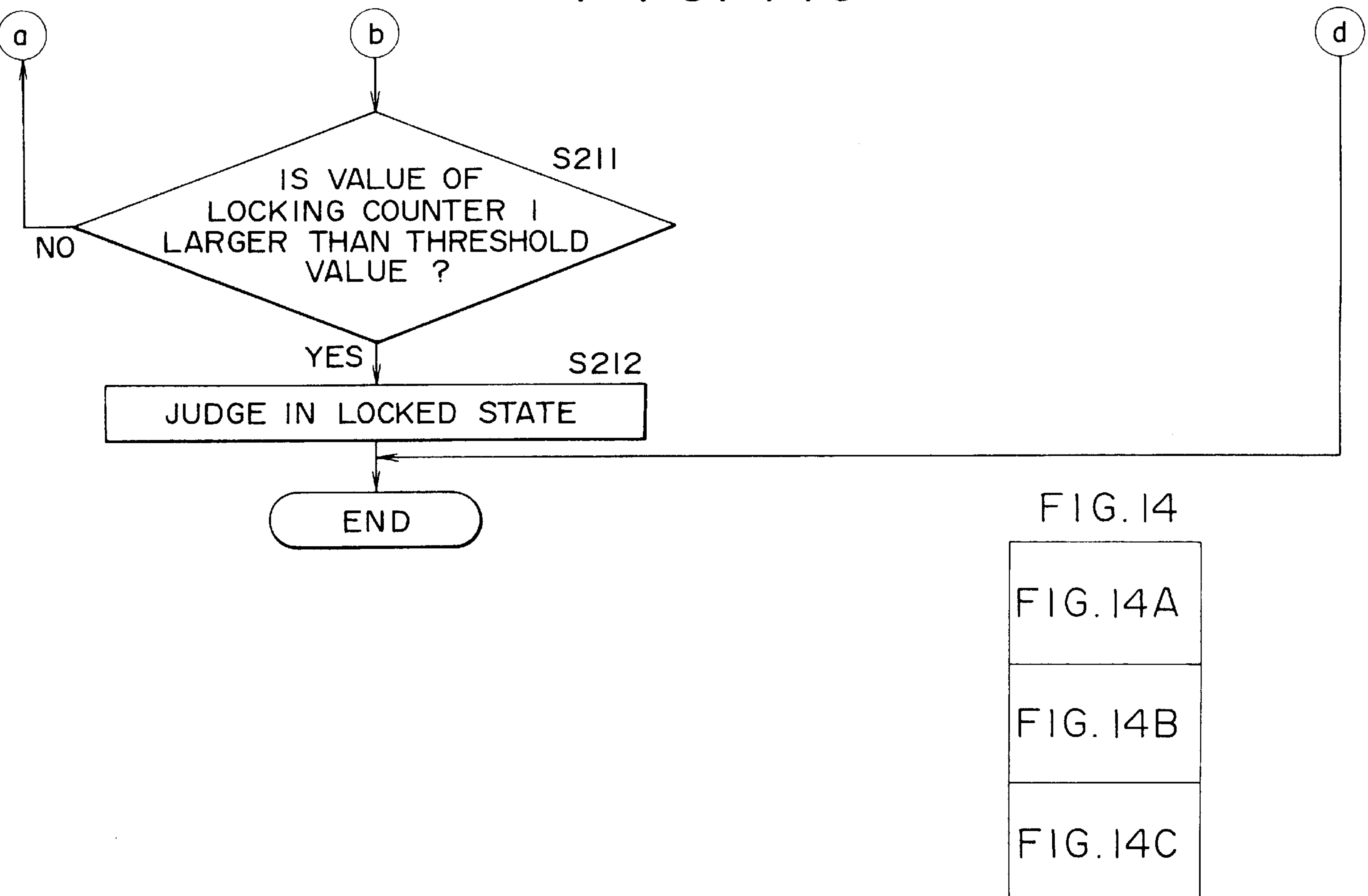
FIGS. 14 and 14A–14C are flowcharts for explaining an example of locking processing executed by an address judging circuit 95 shown in FIG. 13.

FIG. 14 is as flowchart for explaining locking processing by the address judging circuit 95 included in a block 1 in the block diagram shown in FIG. 13. When this processing is executed, the address judging circuit 95 judges in a step S200 whether the respective count values of the locking counter 1 and the address counter 93 are to be initialized or not. As a result, if it is judged that the count values are not to be initialized (NO), processing proceeds to a step S201.

In the step S201, it is judged whether the locking counter and the address counter are unlocked or not, as a result, if it is judged that they are unlocked (YES), processing proceeds to a step S202 and if it is judged that they are not unlocked (NO), the processing is finished (END). If it is judged in the step S200 that the respective count values are to be initialized (YES), processing proceeds to the step S202.

In the step S202, the value of the locking counter 1 built in the address judging circuit 95 and not shown is initialized to zero and the address counter 93 is reset (the count value is initialized to zero). Then, processing proceeds to a step S203 and in the step S203, it is judged whether a regenerative RF signal input at present is equivalent to an address interval or not because an address signal is inserted into a predetermined interval (an address interval) based upon a synchronizing signal in a regenerative RF signal. As a result, if it is judged that a regenerative RF signal is equivalent to an address interval (YES), processing proceeds to a step S204, if it is judged that it is not equivalent to an address interval (NO), processing is returned to the step S203 and the same processing is repeated.

In the step S204, it is judged whether an address value output from the address detecting circuit 90 is normal or not. That is, if it is judged that address data is normal based upon parity data because the parity data is added to address data inserted into an address interval, an address OK signal is output from the address detecting circuit 90. Therefore, it can be judged whether an address is normal or not by referring to this address OK signal. As a result, if it is judged that an address is not normal (NO), processing proceeds to a step S205, after the value of the locking counter 1 is reset to zero, processing is returned to the step S203 and the same processing is repeated. If it is judged that address data is normal (YES), processing proceeds to a step S206.

In the step S206, the address judging circuit 95 outputs a detected address output from the address detecting circuit 90 as a regenerative address.

In the next step S207, it is judged whether a detected address output from the address detecting circuit 90 and a count value of the address counter 93 are equal or not. As a result, if it is judged that the detected address and the count value of the address counter 93 are not equal (NO), processing proceeds to a step S208. In the step S208, the address judging circuit 95 outputs a setting 1 signal and sets the value of the detected address as a count value in the address counter 93. Then, processing proceeds to a step S209 and after a count value of the address counter 93 is incremented by one, the value of the locking counter 1 is reset to zero in the step S205, processing is returned to the step S203 and the same processing is repeated.

If it is judged that the detected address and the count value of the address counter 93 are equal (YES), processing proceeds to a step S210.

In the step S210, a count value of the address counter 93 is incremented by one and the value of the locking counter 1 is similarly incremented by one.

In the next step S211, it is judged whether the value of the locking counter 1 is larger than a predetermined threshold value or not. As a result, if it is judged that the count value of the locking counter 1 is larger than the predetermined threshold value (YES), processing proceeds to a step S212, it is judged that the locking counter is locked and the processing is finished (END).

Also, in the step S211, if it is judged that the value of the locking counter 1 is smaller than the predetermined threshold value or that these values are equal (NO), processing is returned to the step S203 and the same processing is repeated.

Figure 15A:
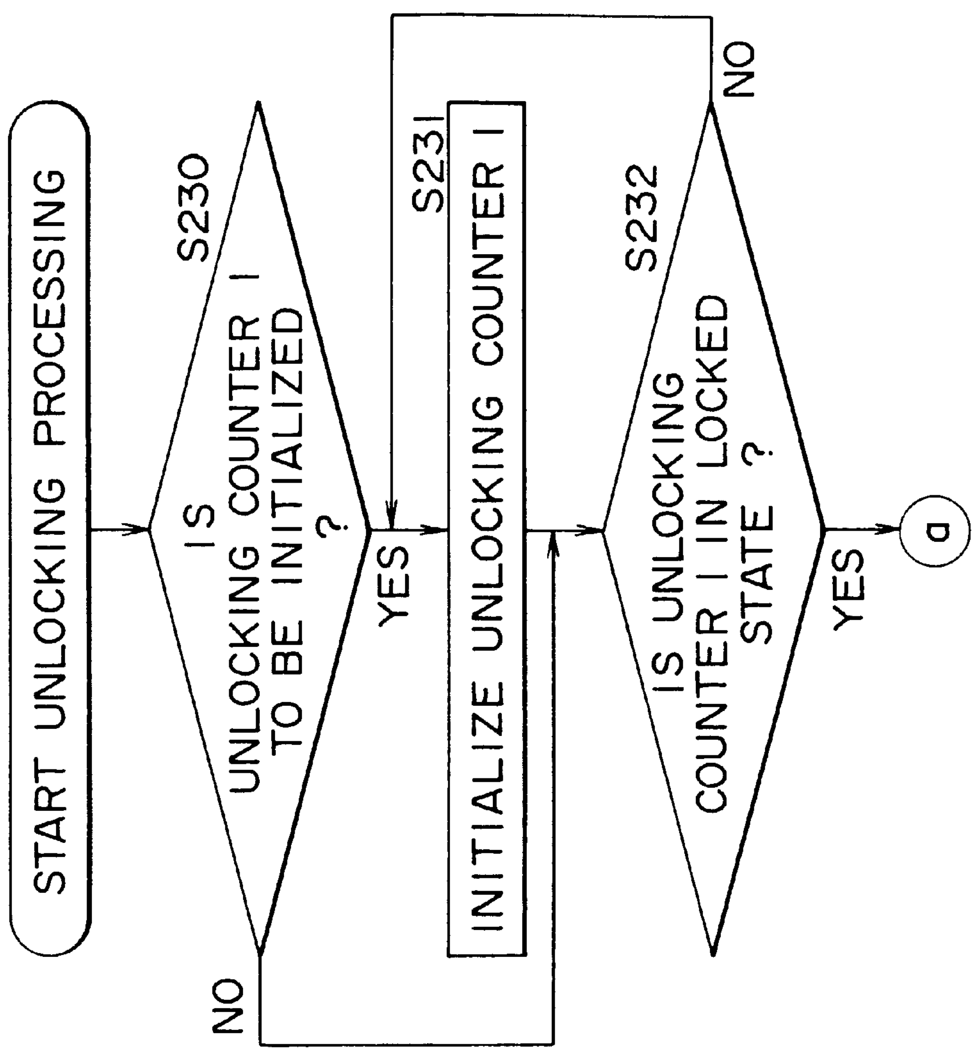
Figures 15, 15C:
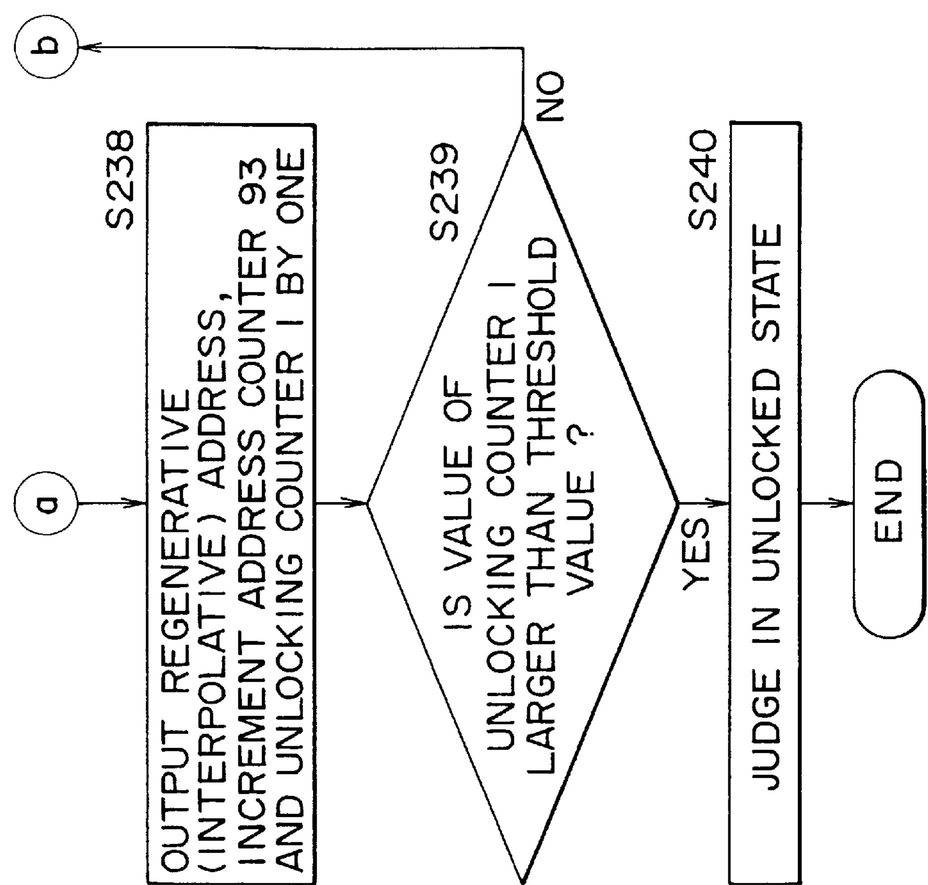

FIG. 15 is a flowchart for explaining unlocking processing similarly executed by the address judging circuit 93.

When this processing is executed, the address judging circuit 93 judges in a step S230 whether the unlocking counter 1 is to be initialized or not. As a result, if it is judged that the unlocking counter is to be initialized (YES), processing proceeds to a step S231 and after the unlocking counter 1 is initialized to zero, processing proceeds to a step 232. If it is judged that the unlocking counter is not to be initialized (NO), processing in the step S231 is skipped and processing proceeds to the step S232.

In the step S232, it is judged whether the unlocking counter is locked or not. As a result, if it is judged that the unlocking counter is locked (YES), processing proceeds to a step S233 and if it is judged that the unlocking counter is not locked (NO), processing is returned to the step S231 and the same processing is repeated.

In the step S233, it is judged whether a regenerative RF signal is equivalent to an address interval or not. As a result, if it is judged that it is not equivalent to an address interval (NO), processing is returned to the step S233 and the same processing is repeated. If it is judged that it is equivalent to an address interval (YES), processing proceeds to a step S234.

In the step S234, it is judged whether an address output from the address detecting circuit 90 is normal or not. That is, the address judging circuit 95 judges whether an address OK signal output from the address detecting circuit 90 is at a high level (means that the address is normal) or not. As a result, if it is judged that the address is not normal (NO), processing proceeds to a step S238 and if it is judged that the address is normal (YES), processing proceeds to a step S235.

In the step S235, the address judging circuit 95 judges whether the detected address and a count value of the address counter 93 are equal or not. As a result, if it is judged that the detected address and the count value of the address counter 93 are equal (YES), processing proceeds to a step S236, the value of the address counter 93 is incremented by one, the value of the unlocking counter 1 is reset to zero and a regenerative address is output. Then, processing is returned to the step S233 and the same processing is repeated.

In the meantime, in the step S235, if it is judged that the detected address and the count value of the address counter 93 are not equal (NO), processing proceeds to a step S237, the address judging circuit 95 outputs a setting 2 signal to the address judging circuit 96 and the address counter 94 and processing proceeds to the step S238.

In the step S238, the value of the address counter 93 (an interpolation address) is output as a regenerative address and the respective values of the address counter 93 and the unlocking counter 1 are incremented by one. That is, after the value of the address counter 93 is output as an interpolation address to interpolate the detected address because in this case, no normal address is detected (it is judged NO in the steps S234 and S235), a count value of the address counter 93 is incremented by one.

In the next step S239, it is judged whether the value of the unlocking counter 1 is larger than a predetermined threshold value or not. As a result, if it is judged that the value of the unlocking counter 1 is larger than the predetermined threshold value (YES), processing proceeds to a step S240, it is judged that the unlocking counter is unlocked and the processing is finished (END). In the meantime, if it is judged that the value of the unlocking counter 1 is smaller than the predetermined threshold value or that these values are equal (NO), processing is returned to the step S233 and the same processing is repeated.

Figure 16B:
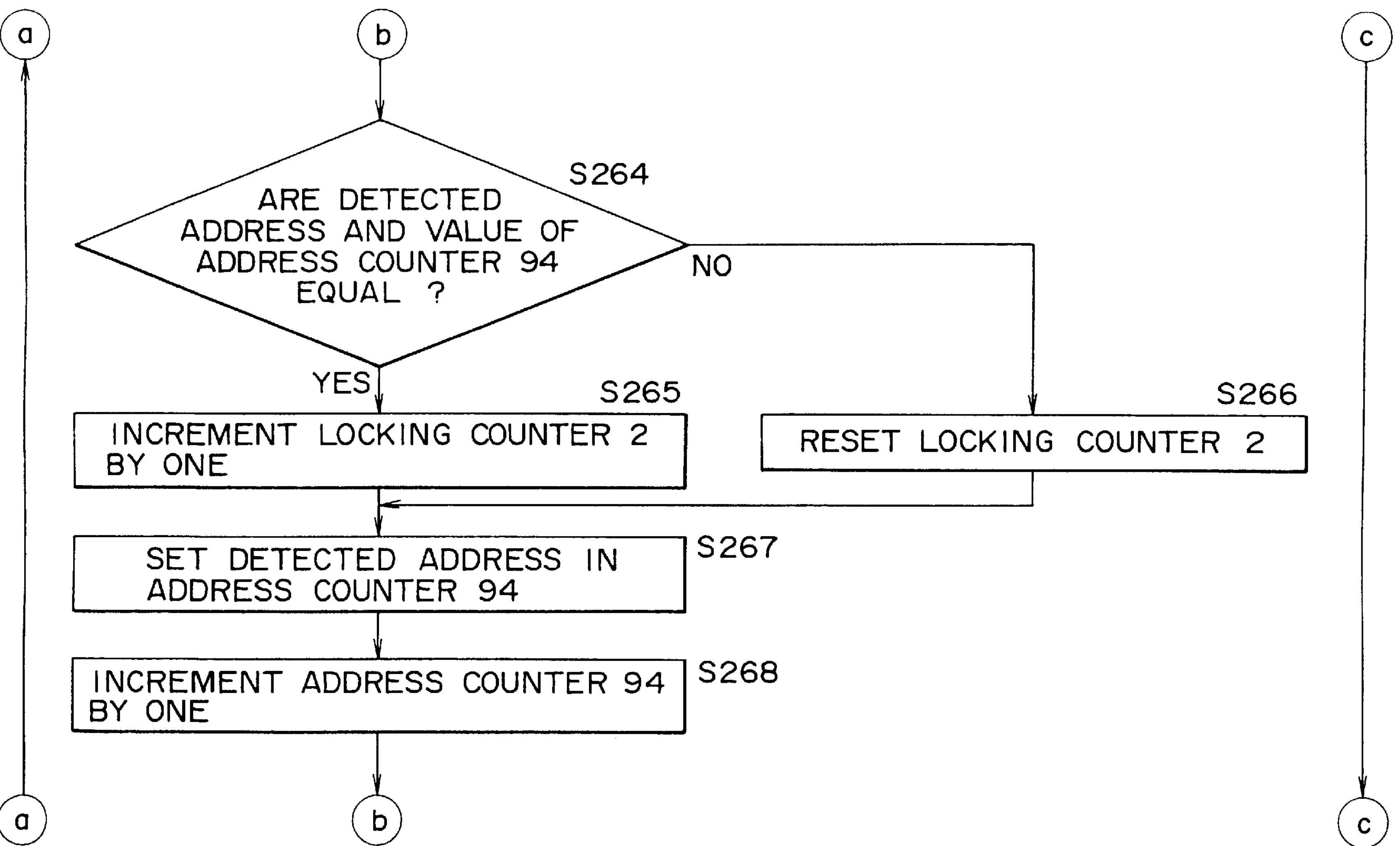
FIGS. 16 and 16A–16C are flowcharts for explaining an example of locking processing executed by an address judging circuit 96 shown in FIG. 13.
Figures 16, 16A, 16B, 16C:
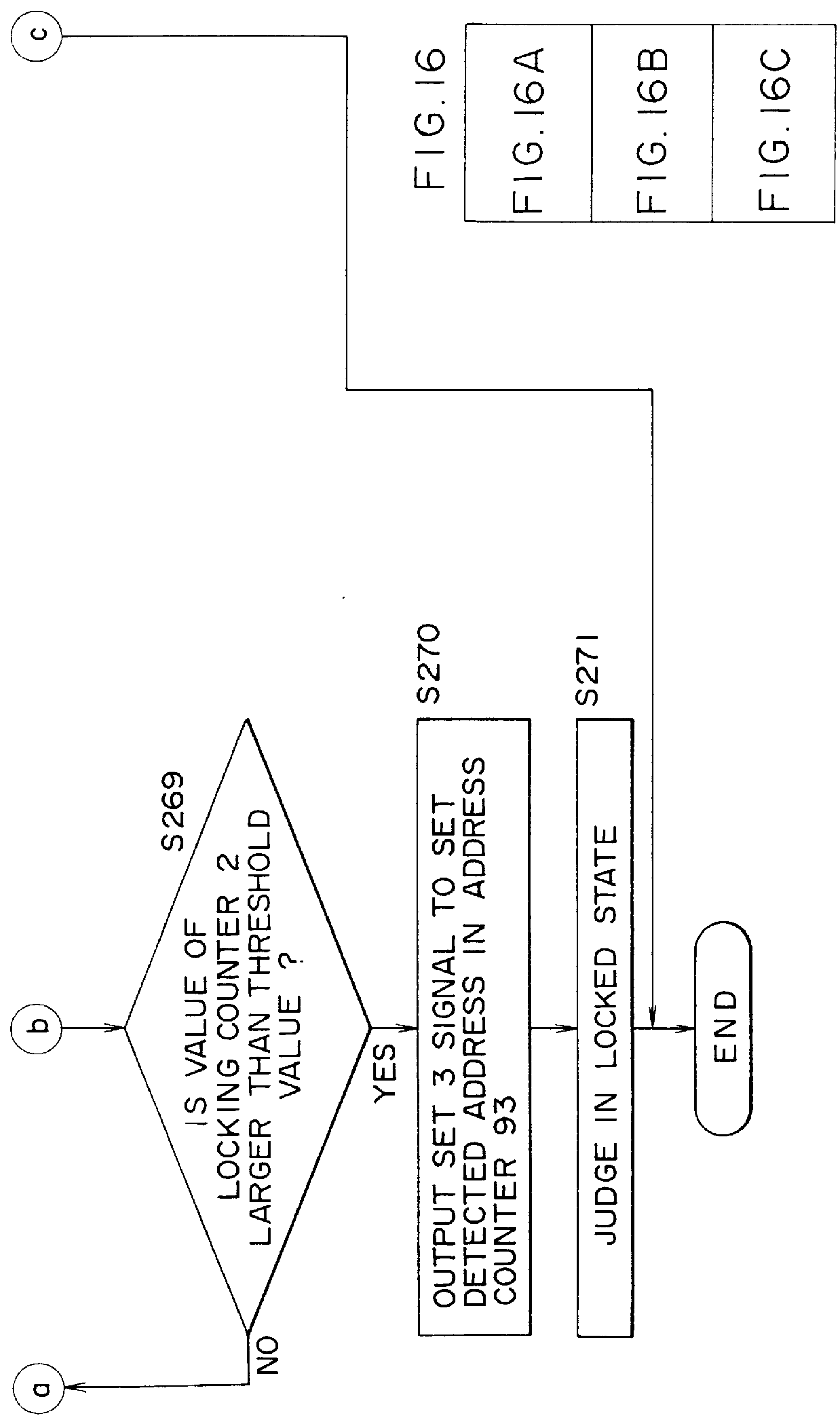

FIG. 16 is a flowchart showing an example of locking processing executed by the address judging circuit 96 shown in FIG. 13.

When this processing is executed, the address judging circuit 96 judges in a step S260 whether the locking counter 2 and the address counter 94 are to be initialized or not. As a result, if it is judged that they are to be initialized (YES), processing proceeds to a step S262. If it is judged that they are not to be initialized (NO), processing proceeds to a step S261.

In the step S261, it is judged whether the locking counter 2 and the address counter 94 are unlocked or not and as a result, if it is judged that they are not unlocked (NO), the processing is finished (END). If it is judged that they are unlocked (YES), processing proceeds to the step S262.

In the step S262, the value of the locking counter 2 is set to zero and a count value of the address counter 94 is reset. Then, processing proceeds to a step S263.

In the step S263, it is judged whether a setting 2 signal is output from the address judging circuit 95 or not. As a result, if it is judged that the setting 2 signal is not output (NO), processing is returned to the step S263 and the same processing is repeated. If it is judged that the setting 2 signal is output (YES), processing proceeds to a step S264.

In the step S264, it is judged whether a detected address and a count value of the address counter 94 are equal or not. As a result, if it is judged that the detected address and the count value of the address counter 94 are equal (YES), processing proceeds to a step S265, the value of the locking counter 2 is incremented by one and processing proceeds to a step S267. If it is judged in the step S264 that the detected address and the count value of the address counter 94 are not equal (NO), processing proceeds to a step S266 and after the value of the locking counter 2 is reset to zero, processing proceeds to the step S267.

In the step S267, the detected address is set in the address counter 94. That is, the detected address output from the address detecting circuit 90 is set as a count value in the address counter 94. Then, processing proceeds to a step S268 and after a count value of the address counter 94 is incremented by one, processing proceeds to a step S269.

In the step S269, it is judged whether the value of the locking counter 2 is larger than a predetermined threshold value or not, as a result, if it is judged that the value of the locking counter 2 is smaller than the predetermined threshold value or that these values are equal (NO), processing is returned to the step S263 and the same processing is repeated. If it is judged that the value of the locking counter 2 is larger than the predetermined threshold value (YES), processing proceeds to a step S270.

In the step S270, the address judging circuit 96 outputs a setting 3 signal and sets the detected address in the address counter 93 as a count value. In a step S271, it is judged that the locking counter 2 and the address counter 94 are locked and the processing is finished (END).

Next, referring to FIGS. 17 and 18, the concrete operation of the above embodiment will be described.

Figures 17A, 17B, 17C:
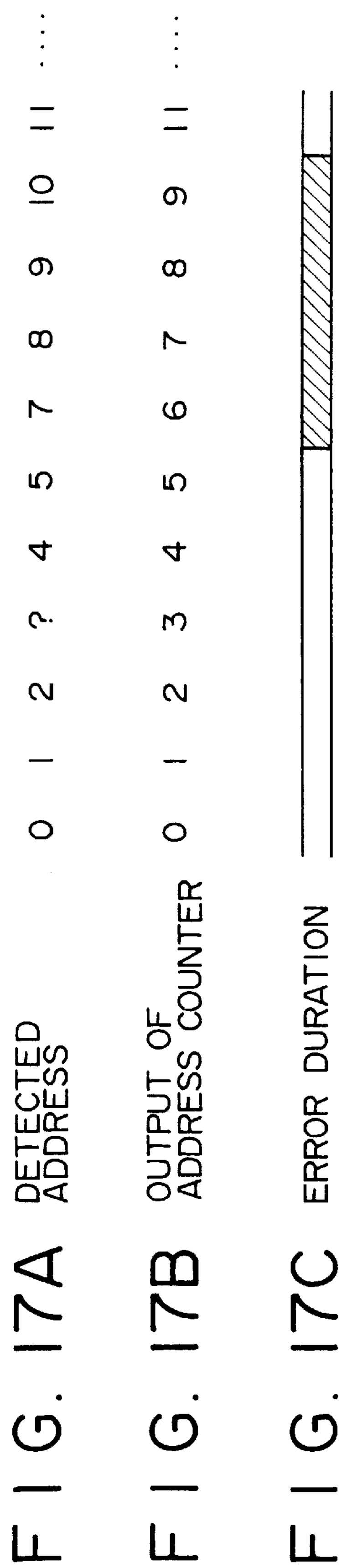
FIGS. 17A–17C explain an example of the operation of a conventional type address regenerator.

FIG. 17 shows an example of operation in case a detected address shown in FIG. 17A is input to a conventional type regenerative address generator.

The conventional type regenerative address generator is constituted only by a block 1 shown in FIG. 13. When a detected address shown in FIG. 17A is input to such a conventional type regenerative address generator, a count value of the address counter 93 is output as an interpolation address in case no detected address is detected for example. That is, if a detected address 3 shown in FIG. 17A is not detected, a count value 3 of the address counter 93 is output.

Suppose that immediately after a detected address 5 is input, the jump of an address and others occur and a detected address 7 is input at timing for a detected address 6 to be input. In that case, a detected address shown in FIG. 17A and a count value shown in FIG. 17B of the address counter 93 are different. In such a case, when a state in which a detected address and a count value of the address counter 93 are different continues four times or more, the address judging circuit 95 resets a count value of the address counter 93 based upon the value of a detected address. That is, in an example shown in FIG. 17, as a detected address 7 is input immediately after a detected address 5 is input, the detected address (=7) and a count value (=6) of the address counter 93 are different. Afterward, when a state in which a detected address and a count value of the address counter 93 are different continues four times (during detected addresses 7 to 10), the address judging circuit 95 sets the value of a detected address in the address counter 93. As a result, if a detected address 11 is input, the detected address and a count value of the address counter 93 are equal.

In such a prior example, if, for example the jump of a track and others occur because if a state in which a count value of the address counter 93 and a detected address are different continues four times, a count value of the address counter 93 is reset, error duration ranges over an interval in which a detected address is detected four times as shown in FIG. 17D.

In the meantime, FIG. 18 is a flowchart for explaining an example of operation in case a detected address shown in FIG. 18A is input to the regenerative address generator shown in FIG. 13 to which the present invention is applied.

Suppose that a first detected address 0 shown in FIG. 18A is detected by the address detecting circuit 90 and input to the block 1. Also, suppose that at that time, processing in the step S202 is executed, the locking counter 1 is initialized to zero and the address counter 93 is reset.

Next, in the step S203, it is judged whether an input regenerative RF signal equivalent to an address interval or not and if it is judged to be an address interval (YES), processing proceeds to the step S204. In the step S204, it is judged based upon an address OK signal whether a detected address is normal or not. If it is judged that an address is normal (YES), a regenerative address (=0) is output in the step S206.

In the next step S207, it is judged whether a detected address and the value of the address counter 93 are equal or not, if it is judged that they are equal (YES), processing proceeds to the step S210 and the respective values of the address counter 93 and the locking counter 1 are incremented by one.

In the step S211, it is judged whether the value of the locking counter 1 is larger than a predetermined threshold value or not. As a result, if it is judged that the value of the locking counter 1 is larger than the predetermined value (YES), it is judged that the locking counter 1 is locked.

Assuming that a threshold value is 1, the value of the locking counter is 2 in case a second detected address 1 is input and as in the step S211, it is judged YES (2>1), the locking counter is locked afterward. As a result, as it is judged in the step S232 in the processing shown in FIG. 15 that the locking counter is locked (YES), processing proceeds to the step S233.

Next, assuming that a fourth detected address 3 is not detected, it is judged in the step S233 shown in FIG. 15 whether it is equivalent to an address interval or not. Assuming that it is equivalent to an address interval, it is judged YES and as a result, processing proceeds to the step S234.

Next, in the step S234, it is judged whether an address is normal or not, however, as the fourth address (=3) cannot be detected, it is judged NO and processing proceeds to the step S238.

In the step S238, after a regenerative (interpolation) address (=3) is output, a count value of the address counter 93 and the value of the unlocking counter 1 are respectively incremented by one. That is, even if no address is detected, an interpolation address is output based upon the count value of the address counter 93.

In the step S239, it is judged whether the value of the unlocking counter 1 is larger than a threshold value or not. If the threshold value is 2, it is judged NO because the value of the unlocking counter 1 is 1, processing is returned to the step S233 and the same processing is repeated.

As for the next detected addresses 4 and 5, each detected address and the value of the address counter 93 are equal, it is judged YES in the step S235. A count value of the address counter 93 is incremented by one, the value of the unlocking counter 1 is reset to zero and the detected addresses (=4, 5) are output in order as regenerative addresses.

Next, if a detected address 6 is not input and a detected address 7 is input (the detected address 6 is skipped due to the jump of a track and others), it is judged in the step S235 shown in FIG. 15 that the detected address (=7) and a count value (=6) of the address counter 93 are not equal (NO) and processing proceeds to the step S237.

In the step S237, a setting 2 signal is output and predetermined processing described later is executed in the address judging circuit 96. Then, processing proceeds to the step S238. In the step S238, a count value of the address counter 93 is output as a regenerative (interpolation) address and the count value of the address counter 93 and the value of the unlocking counter 1 are respectively incremented by one. Then, processing proceeds to the step S239 and it is judged whether the value of the unlocking counter 1 is larger than a threshold value or not. Assuming that the threshold value is 2 as described above, the value of the unlocking counter 1 is reset to zero in the step S236 if a detected address 5 is input. Therefore, as the value of the unlocking counter 1 is 1, it is judged NO in the step S239, processing is returned to the step S233 and the same processing is repeated.

As a setting 2 signal is output in the step S237 as described above, the address judging circuit 96 judges in the S263 shown in FIG. 16 that the setting 2 signal is detected (YES) and advances processing to the step S264.

In the step S264, it is judged whether a detected address and a count value of the address counter 94 are equal or not. As the detected address is 7 and the count value of the address counter 94 is 6 (a value acquired by adding '1' to the last count value '5'), it is judged NO and processing proceeds to the step S266.

In the step S266, the value of the locking counter 2 is reset to zero and processing proceeds to the step S267. In the step S267, the detected address (=7) is set as a count value of the address counter 94 and processing proceeds to the step S268.

In the step S268, a count value of the address counter 94 is incremented by one and processing proceeds to the step S269. In the step S269, it is judged whether the value of the locking counter 2 is larger than a threshold value or not. Assuming that the threshold value is zero, it is judged NO in the step S269 because the value of the locking counter 2 is zero, processing is returned to the step S263 and the same processing is repeated.

As a count value of the address counter 93 is 7 (a value acquired by incrementing the last value 6 by one when a detected address 8 is input as shown in FIG. 15, it is judged NO in the step S235, processing proceeds to the step S237 and a setting 2 signal is again output.

As a result, in the step S263 shown in FIG. 16, it is judged YES as last time, processing proceeds to the step S264 and it is judged whether a detected address and the value of the address counter 94 are equal or not. As the value of the address counter 94 is changed to '7' in the processing in the last step S267 and further changed to '8' by the processing in the step S268, it is judged in the step S264 that the detected address (=8) and the count value (=8) of the address counter 94 are equal (YES) and processing proceeds to the step S265.

In the step S265, the value of the locking counter 2 is incremented by one to be '1' (=0+1) and processing proceeds to the step S267. In the step S267, the detected address (=8) is set in the address counter 94, in the step S268, the value of the address counter 94 is incremented by one and processing proceeds to the step S269.

In the step S269, it is judged whether the value of the locking counter 2 is larger than a threshold value or not. As the value of the locking counter 2 is 1 and the threshold value is zero, it is judged YES in the step S269 and processing proceeds to the step S270. In the step S270, the address judging circuit 96 outputs a setting 3 signal to the address counter 93. As a result, the value (=8) of the detected address is set in the counter 93. That is, the detected address 8 is set in the address counter 93. Then, processing proceeds to a step S291, it is judged that the address counter is locked and the processing is finished (END).

After the above processing shown in FIG. 16 is executed simultaneously when a setting 2 signal is output in the step S237 shown in FIG. 15, the processing in the step S238 is executed. In the step S238, a count value '8' of the address counter 93 is output as a regenerative (interpolation) address and after the respective values of the address counter 93 and the unlocking counter 1 are incremented by one, processing proceeds to the step S239. In the step S239, it is judged whether the value of the unlocking counter 1 is larger than a threshold value or not. As the threshold value is 2 and the value of the unlocking counter 1 is 2, processing is returned to the step S233 and the same processing is repeated.

Next, as the respective count values of the address counters 93 and 94 are both 9 as described above in case a detected address 9 is input, it may be said that the counters are both synchronous. In the later processing (processing related to detected addresses 10 and 11), a detected address and a count value of the address counter 93 are equal as shown in FIG. 18.

According to the above embodiment, as error duration can be reduced as shown in FIG. 18D, compared with a prior example shown in FIG. 17D, address regeneration error duration can be reduced even if the jump of a track and others occur.

A threshold value in the above embodiments can be suitably changed. For example, timing at which a setting 3 signal is output can be changed by changing a threshold value in the step S269. As for the other threshold values, an optimum value may be similarly suitably set according to a device to which the present invention is applied.

In the above embodiments, information recorded on a recording medium is regenerated, however, it need scarcely be said that information transmitted via a transmitting medium for example may be also regenerated.

As described above, according to aspects of the present invention, as an inserted signal is generated according to timing at which an inserted signal periodically inserted into information is detected and the timing of count in the different two counters, an inserted signal such as a synchronizing signal and an address signal can be precisely regenerated. As a result, the reliability of regenerated data can be further enhanced. As the generation rate of errors can be reduced, the load of an error correcting section can be reduced.

What is claimed is:

1. A regenerator for regenerating digital data, comprising:

extracting means for extracting a synchronizing signal from the digital data;

first reference counting means for generating a reference period having a predetermined time interval;

first window signal generating means for generating first and second window signals in accordance with a count value from the first reference counting means;

first synchronization judging means for judging whether or not the extracted synchronizing signal includes the first window signal;

first resetting means for resetting the count value of the first reference counting means if the extracted synchronizing signal does not include the first window signal;

second reference counting means for generating a reference period having another timing in a same cycle as that of the first reference counting means;

second window signal generating means for generating a third window signal in accordance with a count value from the second reference counting means;

second synchronization judging means for judging whether or not the extracted synchronizing signal includes the second and third window signals; and second resetting means for resetting the count values of the first reference counting means and the second reference counting means, if the extracted synchronizing signal includes the second and third window signals.

2. The regenerator according to claim 1, wherein the synchronizing signal is an address signal.

3. The regenerator according to claim 1, further comprising:

comparison means for comparing the counter value of the second reference counting means and a predetermined reference value, and if the counter value of the second counting means is greater than the predetermined reference value, the second resetting means resets the counter values of the first reference counting means.

4. A regenerating method for regenerating digital data, comprising the steps of:

extracting a synchronizing signal from the digital data;

generating a reference period having a predetermined time interval;

generating first and second window signals in accordance with a first count value;

judging whether or not the extracted synchronizing signal includes the first window signal;

resetting the first count value if the extracted synchronizing signal does not include the first window signal;

generating a reference period having another timing in a same cycle as that of the first count value;

generating a third window signal in accordance with a second count value from the reference period having another timing;

judging whether or not the extracted synchronizing signal includes the second and third window signals; and resetting the first and second count values if the extracted synchronizing signal includes the second and third window signals.

5. The method of regenerating according to claim 4, wherein the synchronizing signal is an address signal.

6. The method of regenerating according to claim 4, further comprising the steps of:

comparing the second count value and a predetermined reference value, and if the second count value is greater than the predetermined reference value, resetting the first count value.

7. A reproducing apparatus, comprising:

reproducing means for reproducing from a recording medium digital data including a synchronizing signal;

extracting means for extracting the synchronizing signal from the digital data;

first reference counting means for generating a reference period having a predetermined time interval;

first window signal generating means for generating first and second window signals in accordance with a count value from the first reference counting means;

first synchronization judging means for judging whether or not the extracted synchronizing signal includes the first window signal;

first resetting means for resetting the count value of the first reference counting means if the extracted synchronizing signal does not include the first window signal;

second reference counting means for generating a reference period having another timing in a same cycle as that of the first reference counting means;

second window signal generating means for generating a third window signal in accordance with a count value from the second reference counting means;

second synchronization judging means for judging whether or not the extracted synchronizing signal includes the second and third window signals; and second resetting means for resetting the count values of the first reference counting means and the second reference counting means, if the extracted synchronizing signal includes the second and third window signals.

8. The reproducing apparatus according to claim 7, wherein the synchronizing signal is an address signal.

9. The reproducing apparatus according to claim 7, further comprising:

comparison means for comparing the counter value of the second reference counting means and a predetermined reference value, and if the counter value of the second counting means is greater than the predetermined reference value, the second resetting means resets the counter values of the first reference counting means.

10. A method of reproducing digital data, comprising the steps of:

reproducing from a recording medium the digital data, the digital data including a synchronizing signal;

extracting a synchronizing signal from the digital data;

generating a reference period having a predetermined time interval;

generating first and second window signals in accordance with a first count value;

judging whether or not the extracted synchronizing signal includes the first window signal;

resetting the first count value if the extracted synchronizing signal does not include the first window signal;

generating a reference period having another timing in a same cycle as that of the first count value;

generating a third window signal in accordance with a second count value from the reference period having another timing;

judging whether or not the extracted synchronizing signal includes the second and third window signals; and resetting the first and second count values if the extracted synchronizing signal includes the second and third window signals.

11. The method of reproducing according to claim 10, wherein the synchronizing signal is an address signal.

12. The method of reproducing according to claim 10, further comprising the steps of:

comparing the second count value and a predetermined reference value, and if the second count value is greater than the predetermined reference value, resetting the first count value.

13. A regenerator for regenerating digital data, comprising:

a detector for extracting a synchronizing signal from the digital data;

a first reference counter for generating a reference period having a predetermined time interval;

a first window signal generator for generating first and second window signals in accordance with a count value from the first reference counter;

a first synchronization judging circuit for judging whether or not the extracted synchronizing signal includes the first window signal;

a first resetting circuit for resetting the count value of the first reference counter if the extracted synchronizing signal does not include the first window signal;

a second reference counter for generating a reference period having another timing in a same cycle as that of the first reference counter;

a second window signal generator for generating a third window signal in accordance with a count value from the second reference counter;

a second synchronization judging circuit for judging whether or not the extracted synchronizing signal includes the second and third window signals; and a second resetting circuit for resetting the count values of the first reference counter and the second reference counter, if the extracted synchronizing signal includes the second and third window signals.

14. The regenerator according to claim 13, wherein the synchronizing signal is an address signal.

15. The regenerator according to claim 13, further comprising:

a comparator for comparing the counter value of the second reference counter and a predetermined reference value, and if the counter value of the second counter is greater than the predetermined reference value, the second resetting circuit resets the counter values of the first reference counter.

16. A reproducing apparatus, comprising:

an optical pickup for reproducing from a recording medium digital data including a synchronizing signal;

a detector for extracting the synchronizing signal from the digital data;

a first reference counter for generating a reference period having a predetermined time interval;

a first window signal generator for generating first and second window signals in accordance with a count value from the first reference counter;

a first synchronization judging circuit for judging whether or not the extracted synchronizing signal includes the first window signal;

a first resetting circuit for resetting the count value of the first reference counter if the extracted synchronizing signal does not include the first window signal;

a second reference counter for generating a reference period having another timing in a same cycle as that of the first reference counter;

a second window signal generator for generating a third window signal in accordance with a count value from the second reference counter;

a second synchronization judging circuit for judging whether or not the extracted synchronizing signal includes the second and third window signals; and a second resetting circuit for resetting the count values of the first reference counter and the second reference counter, if the extracted synchronizing signal includes the second and third window signals.

17. The reproducing apparatus according to claim 16, wherein the synchronizing signal is an address signal.

18. The reproducing apparatus according to claim 16, further comprising:

a comparator for comparing the counter value of the second reference counter and a predetermined reference value, and if the counter value of the second counter is greater than the predetermined reference value, the second resetting circuit resets the counter values of the first reference counter.

* * * * *